(12) United States Patent
Shen et al.

(10) Patent No.: US 11,775,815 B2
(45) Date of Patent: Oct. 3, 2023

(54) SYSTEM AND METHOD FOR DEEP MEMORY NETWORK

(71) Applicant: Samsung Electronics Co., Ltd., Suwon-si (KR)

(72) Inventors: Yilin Shen, Santa Clara, CA (US); Yue Deng, Sunnyvale, CA (US); Avik Ray, Sunnyvale, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 885 days.

(21) Appl. No.: 16/535,380

(22) Filed: Aug. 8, 2019

(65) Prior Publication Data
US 2020/0050934 A1    Feb. 13, 2020

Related U.S. Application Data
(60) Provisional application No. 62/717,193, filed on Aug. 10, 2018.

(51) Int. Cl.
*G06N 3/08*  (2023.01)
*G06N 5/04*  (2023.01)

(52) U.S. Cl.
CPC .............. *G06N 3/08* (2013.01); *G06N 5/04* (2013.01)

(58) Field of Classification Search
CPC .................................. G06N 3/08; G06N 5/04
USPC ......................................................... 706/21
See application file for complete search history.

(56) References Cited

U.S. PATENT DOCUMENTS

| | | | |
|---|---|---|---|
| 6,078,918 A * | 6/2000 | Allen | G06F 40/274 707/999.005 |
| 9,454,732 B1 | 9/2016 | Garton et al. | |
| 9,542,454 B2 * | 1/2017 | Lee | G06F 16/5838 |
| 9,558,748 B2 | 1/2017 | Lane et al. | |
| 9,715,642 B2 | 7/2017 | Szegedy et al. | |
| 2002/0147694 A1 | 10/2002 | Dempsey et al. | |
| 2008/0103996 A1 | 5/2008 | Forman et al. | |
| 2014/0156568 A1 | 6/2014 | Ganguly et al. | |

(Continued)

FOREIGN PATENT DOCUMENTS

KR    10-0921892 B1    10/2009
KR    10-2015-0065171 A    6/2015

(Continued)

OTHER PUBLICATIONS

Dar, et al, "Semantic Data Caching and Replacement", Proceedings of the 22nd VLDB Conference, Mumbai, India, 1996 (Year: D) (Year: 1996).*

(Continued)

*Primary Examiner* — Tsu-Chang Lee

(57) ABSTRACT

An electronic device including a deep memory model includes at least one memory and at least one processor coupled to the at least one memory. The at least one processor is configured to receive input data to the deep memory model. The at least one processor is also configured to extract a history state of an external memory coupled to the deep memory model based on the input data. The at least one processor is further configured to update the history state of the external memory based on the input data. In addition, the at least one processor is configured to output a prediction based on the extracted history state of the external memory.

20 Claims, 13 Drawing Sheets

(56) References Cited

U.S. PATENT DOCUMENTS

2015/0142713 A1    5/2015   Gopinathan et al.
2016/0350653 A1   12/2016   Socher et al.
2017/0169332 A1    6/2017   Graves et al.
2017/0228637 A1    8/2017   Santoro et al.

FOREIGN PATENT DOCUMENTS

WO    2015/073771 A2   5/2015
WO     2017100711 A1   6/2017

OTHER PUBLICATIONS

International Search Report and Written Opinion of the International Searching Authority in connection with International Patent Application No. PCT/KR2019/010083 dated Nov. 21, 2019, 10 pages.
Supplementary European Search Report dated May 3, 2021 in connection with European Patent Application No. 19848.206.9, 10 pages.
Graves et al., "Hybrid computing using a neural network with dynamic external memory," Nature, vol. 538, No. 7626, Oct. 2016, 21 pages.
Ma et al., "Visual Question Answering with Memory-Augmented Networks," arXiv:1707.04968v1 [cs.CV], Jul. 2017, 10 pages.
Santoro et al., "One-shot Learning with Memory-Augmented Neural Networks," arXiv:1605.06065v1 [cs.LG], May 2016, 13 pages.
Shen et al., "Interactive Recommendation via Deep Neural Memory Augmented Contextual Bandits," Recommender Systems, ACM, Sep. 2018, 9 pages.

* cited by examiner

SYSTEM AND METHOD FOR DEEP MEMORY NETWORK

CROSS-REFERENCE TO RELATED APPLICATION AND CLAIM OF PRIORITY

This application claims priority under 35 U.S.C. § 119(e) to U.S. Provisional Patent Application No. 62/717,193 filed on Aug. 10, 2018 and entitled "Interactive Recommendation via Deep Neural Memory." This provisional patent application is hereby incorporated by reference in its entirety.

TECHNICAL FIELD

This disclosure relates generally to machine learning systems. More specifically, this disclosure relates to a system and method for a deep memory network.

BACKGROUND

Intelligent services models have become important for various services, such as artificially-intelligent personal assistants, smart televisions, online web services, image recognition, and so on. For example, most service providers usually require maintaining a large amount of content and collecting user history data to provide intelligent services. Models often require a large number of interactions with each user to provide high-quality personalized services. In order to enable an intelligent service, a model typically has to be pre-trained on the same task before deployment (which is costly) and often needs to be retrained after deployment (which is difficult). Such models also do not have the capability to remember interaction history with users. As a result, existing approaches cannot easily enable each user's personalized needs or adapt to users' new needs over time.

SUMMARY

This disclosure provides a system and method for a deep memory network.

In a first embodiment, a method for managing a deep memory model coupled to an external memory includes receiving input data to the deep memory model. The method also includes extracting a history state of the external memory based on the input data. The method further includes updating the history state of the external memory based on the input data. In addition, the method includes outputting a prediction based on the extracted history state of the external memory.

In a second embodiment, an electronic device including a deep memory model includes at least one memory and at least one processor coupled to the at least one memory. The at least one processor is configured to receive input data to the deep memory model. The at least one processor is also configured to extract a history state of an external memory coupled to the deep memory model based on the input data. The at least one processor is further configured to update the history state of the external memory based on the input data. In addition, the at least one processor is configured to output a prediction based on the extracted history state of the external memory.

In a third embodiment, a non-transitory computer readable medium embodies a computer program. The computer program includes instructions that when executed cause at least one processor of an electronic device to receive input data to a deep memory model. The computer program also includes instructions that when executed cause the at least one processor extract a history state of an external memory coupled to the deep memory model based on the input data. The computer program further includes instructions that when executed cause the at least one processor to update the history state of the external memory based on the input data. In addition, the computer program includes instructions that when executed cause the at least one processor to output a prediction based on the extracted history state of the external memory.

In a fourth embodiment, a method for training a deep memory model coupled to an external memory includes selecting a data set from among a plurality of data sets. The method also includes adding the selected data set to a training sample, where the training sample includes a plurality of history states of the deep memory model. The method further includes creating one or more mini-batches from the plurality of history states. In addition, the method includes training the deep memory model using the one or more mini-batches and updating one or more parameters of the deep memory model.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
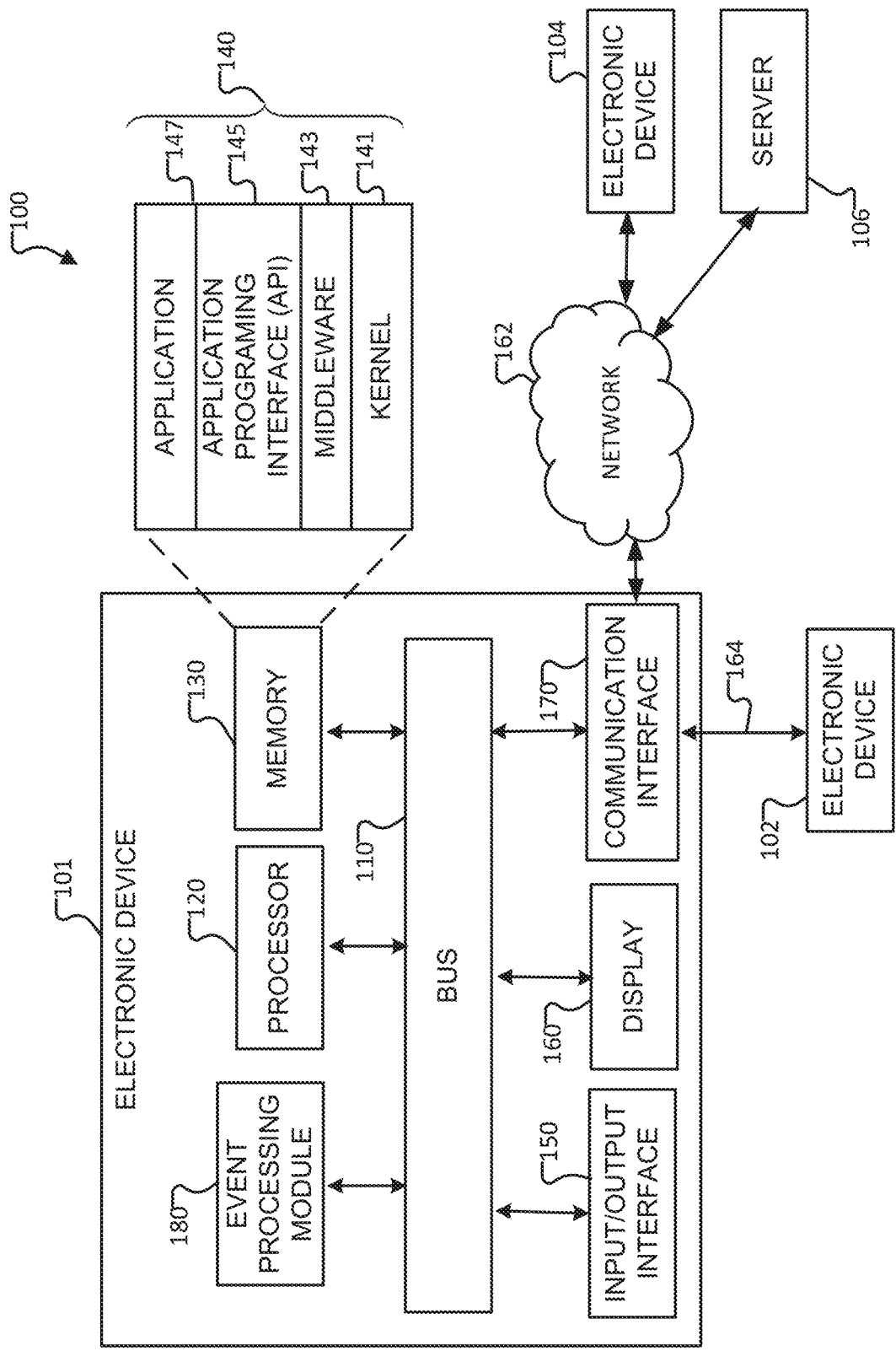
FIG. 1 illustrates an example network configuration in accordance with various embodiments of this disclosure.

FIGS. 1 through 12, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

Various embodiments of this disclosure alleviate the drawbacks of existing intelligent services models by introducing a model including an external memory that can memorize new data, including both content (such as images) and user feedback (such as user comments or labels). The external memory allows the model to naturally and continuously adapt to a user's new needs. The external memory incorporates real-world, more complex tasks than existing models. The external memory also allows for the model to track user dynamics without the need of retraining.

Before deployment, the model takes inputs such as a plurality of user data with some common features for training the model. After deployment of the model, the model receives real-time inputs such as a user's dynamic, personal data. When the new user data shares some common features, the model can store the common features in the external memory to remember the learned features and can continuously adapt to the newest data over time. The new user data can be completely independent of the model's training data, such that the model can learn common features of the data without needing to be trained on those common features before deployment and without needing to be retrained to recognize the common features. The model thus does not need to be retrained to adapt to new data. In addition, the model causes new common features to be remembered in the external memory so that the model can be quickly adapted to new tasks after deployment.

In some embodiments, the model includes or is used by or in conjunction with a controller that controls a read head to (i) determine the most relevant external memory cells sharing common features with new data and read data from the external memory to output other data that shares common features with the new data and/or (ii) predict a nature of the data, for example, to provide a recommendation or to classify or label input data. The controller also controls a write head to determine which memory cells in the external memory include least relevant data and to overwrite the least relevant data in order to continuously update and adapt the model for new data as it is received by the model.

Some embodiments include a deep neural memory augmented model to track the history state for each user based on the user's previous interactions. As such, the user's preferences on new items can be quickly learned within a small number of interactions. The model leverages a large amount of user history data for offline model training. In order to train the model, an offline training algorithm is provided based on a mini-batch construction mechanism such that any user or item data can be used together as a large-scale training set to train a high-quality base model offline. Some embodiments can also include online model fine-tuning using one or more history states, which can mitigate the required number of interactions with each user. To model the history state, some embodiments couple deep neural networks with the external neural memory, motivated by the capability of the external neural memory to quickly remember new information.

FIG. 1 illustrates an example network configuration 100 in accordance with various embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network environment 100. The electronic device 101 can include at least one of a bus 110, a processor 120, a memory 130, an input/output (K)) interface 150, a display 160, a communication interface 170, or an event processing module 180. In some embodiments, the electronic device 101 may exclude at least one of the components or may add another component.

The bus 110 includes a circuit for connecting the components 120 to 180 with one another and transferring communications (such as control messages and/or data) between the components. The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor can be a graphics processor unit (GPU). In accordance with various embodiments of this disclosure, the processor 120 can train or execute machine learning models, such as by receiving inputs, extracting history states from external memory to predict a recommendation or reward prediction for the input, overwrite history states in an external memory based on the input; or perform other tasks.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes; for example, a kernel 141, middleware 143, an application programming interface (API) 145, and/or an application program (or "application") 147. At least a portion of the kernel 141, middleware 143, or API 145 may be denoted an operating system (OS). In some embodiments, the memory 130 can be an external memory used by a model, which may be stored on the electronic device 101, an electronic device 102, an electronic device 104, or a server 106.

The kernel 141 can control or manage system resources (such as the bus 110, processor 120, or a memory 130) used to perform operations or functions implemented in other programs (such as the middleware 143, API 145, or application program 147). The kernel 141 provides an interface that allows the middleware 143, the API 145; or the application 147 to access the individual components of the electronic device 101 to control or manage the system resources. The application 147 can include an application that receives inputs, extracts history states from external memory to predict a recommendation or reward prediction for the input, overwrites history states in an external memory based on the input, or performs other tasks The middleware 143 can function as a relay to allow the API 145 or the application 147 to communicate data with the kernel 141, for example. A plurality of applications 147 can be provided. The middleware 143 is able to control work requests received from the applications 147, for example, by allocating the priority of using the system resources of the electronic device 101 (such as the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (such as a command) for filing control, window control, image processing or text control.

The IO interface 150 serves as an interface that can, for example, transfer commands or data input from a user or other external devices to other component(s) of the electronic device 101. Further, the IO interface 150 can output commands or data received from other component(s) of the electronic device 101 to the user or the other external device.

The display 160 may include, for example, a liquid crystal display (LCD), a light emitting diode (LED) display, an organic light emitting diode (OLED) display, a quantum light emitting diode (QLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as signals received by the communication interface 170 regarding data input signals, recommendation or reward prediction signals, or other signals.

The electronic device 101 further includes one or more sensors that can meter a physical quantity or detect an activation state of the electronic device 101 and convert metered or detected information into an electrical signal. For example, a sensor can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) can further include a control circuit for controlling at least one of the sensors included therein. Any of these sensor(s) can be located within the electronic device 101.

The wireless communication is able to use at least one of, for example, long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UNITS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function, according to embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. The server 106 can also include an event processing module (not shown) that may support the event processing module 180 implemented in the electronic device 101. For example, the event processing module 180 can process at least a part of information obtained from other elements (such as the processor 120, the memory 130, the input/output interface 150, or the communication interface 170) and can provide the same to the user in various manners.

While in FIG. 1 the event processing module 180 is shown to be a module separate from the processor 120, at least a portion of the event processing module 180 can be included or implemented in the processor 120 or at least one other module, or the overall function of the event processing module 180 can be included or implemented in the processor 120 or another processor. The event processing module 180 can perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
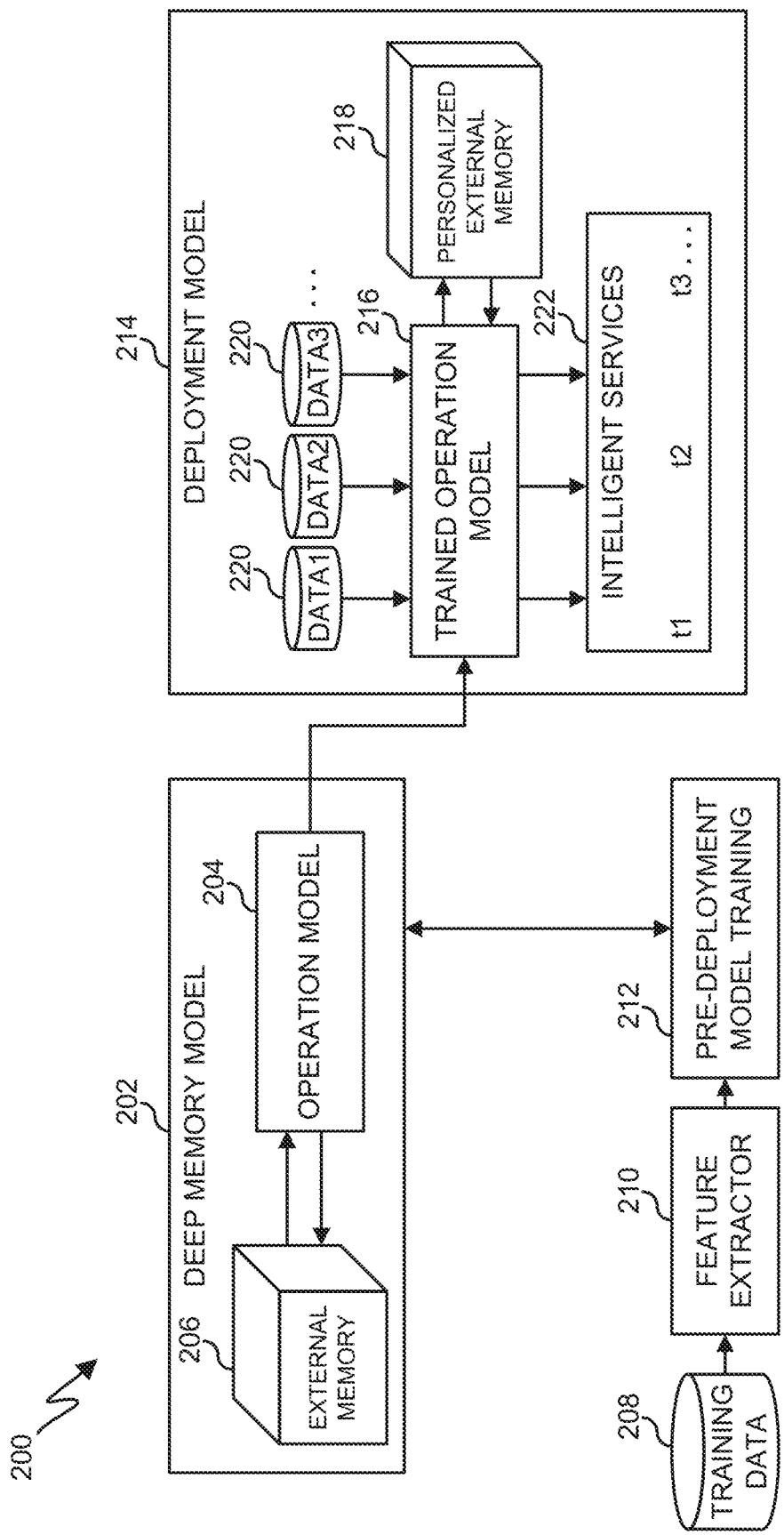
FIG. 2 illustrates an example deep memory system in accordance with various embodiments of this disclosure.

FIG. 2 illustrates an example deep memory system 200 in accordance with various embodiments of this disclosure. The system 200 includes a deep memory model 202 that includes an operation model 204 that is coupled to or operates in conjunction with an external memory 206. The operation model 204 is a model that learns to store input data in the external memory 206 in association with other data that share common features. When new data is received by the operation model 204, the operation model 204 reads previously-stored data or data history states from the external memory 206 to determine which other previously-provided data shares common features with the new data. The external memory 206 can also store, in association with content data, reward data, such as user feedback, labels, confirmed recommendations, or other reward data that characterizes the content data. The operation model 204 can thus provide recommendation or reward predictions by determining which content data shares common features with new input data and using the reward data associated with the stored content data to predict a recommendation or reward for the new input data.

The deep memory model 202 is trained using training data 208 that can include content such as natural language, images, or other content. The training data 208 can also include history states that are crowdsourced or otherwise obtained from other users or that are created or manufactured for training purposes. A feature extractor 210 extracts the features of the training data 208. The feature extractor 210 can be a model for specific artificial intelligence tasks, such as utterance slot determination, image recognition or feature detection, or other tasks. Pre-deployment model training 212 includes training operations that use the training data 208, data provided by the feature extractor 210, and/or history state data to train the deep memory model 202 on the training data before deployment of the deep memory model 202. The pre-deployment model training 212 serves to train the operation model 204 on how to read/write to the external memory 206. In some embodiments, the pre-deployment model training 212 does not cause the external memory 206 to be changed or updated, as the external memory 206 is a vehicle for storing data, while the operation model 204 is trained on how to store, read, and write or overwrite the data in the external memory 206.

In some embodiments, in order to train the deep memory model 202, an offline training algorithm that utilizes a large amount of history data from all users as a training set can be used. Also, in some embodiments, the model 202 can be further trained using an online training process for dynamic model fine-tuning for each user to personalize the model. Further, in some embodiments, online training can be applied to interleaved users by maintaining different states for each user.

After training, a deployment model 214 can be provided. The deployment model 214 includes a trained operation model 216 that performs similar functions as the operation model 204, but the operation model 216 is trained for effectively storing, reading, and writing data on content that shares common features to a personalized external memory 218. In some embodiments, the personalized external memory 218 is provided for an individual user, organization, or system for storing content data and reward data sharing common features in order to continuously adapt stored data to provide efficient recommendations and accurate predictions using the trained operation model 216. In particular embodiments, the personalized external memory 218 can be provided on the same device as the trained operation model 216, such as one or more of the electronic devices 101, 102, and 104 or the server 106. In other particular embodiments, the personalized external memory 218 can be provided on a different device or otherwise as part of a distributed computing system.

As new data 220 is received by the trained operation model 216, the operation model 216 uses the personalized external memory 218 to provide intelligent services 222 based on the new data 220. For example, the operation model 216 can provide similar data that shares common features with the new data 220 from the personalized external memory 218 or provide recommendations or reward predictions based on the new data 220. The intelligent services 222 can provide different services at each timestamp based on remembered dynamic user data.

Although FIG. 2 illustrates one example of a deep memory system 200, various changes may be made to FIG. 2. For example, the deep memory system 200 may not include the feature extractor 210 if the training data 208 includes just history state data to be used to provide history states for training the deep memory model 202. Also, some embodiments of the deep memory system 200 can forego or delay providing intelligent services 222 while writing or overwriting data to the personalized external memory 218, such as in order to use the data to provide services at a later time or in response to an event.

Figure 3A:
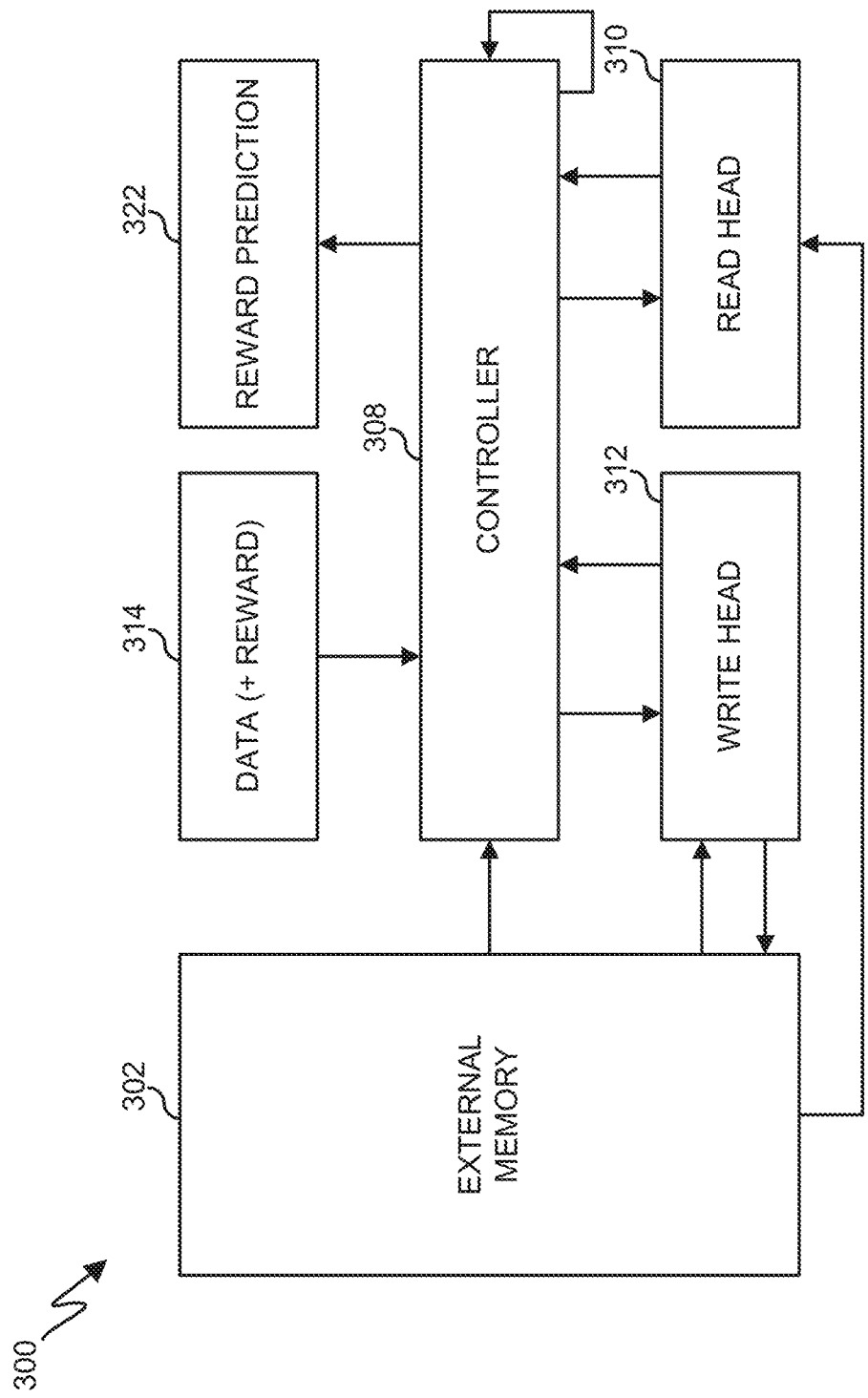
FIGS. 3A and 3B illustrate examples of a deep memory model in accordance with various embodiments of this disclosure.
Figure 3B:
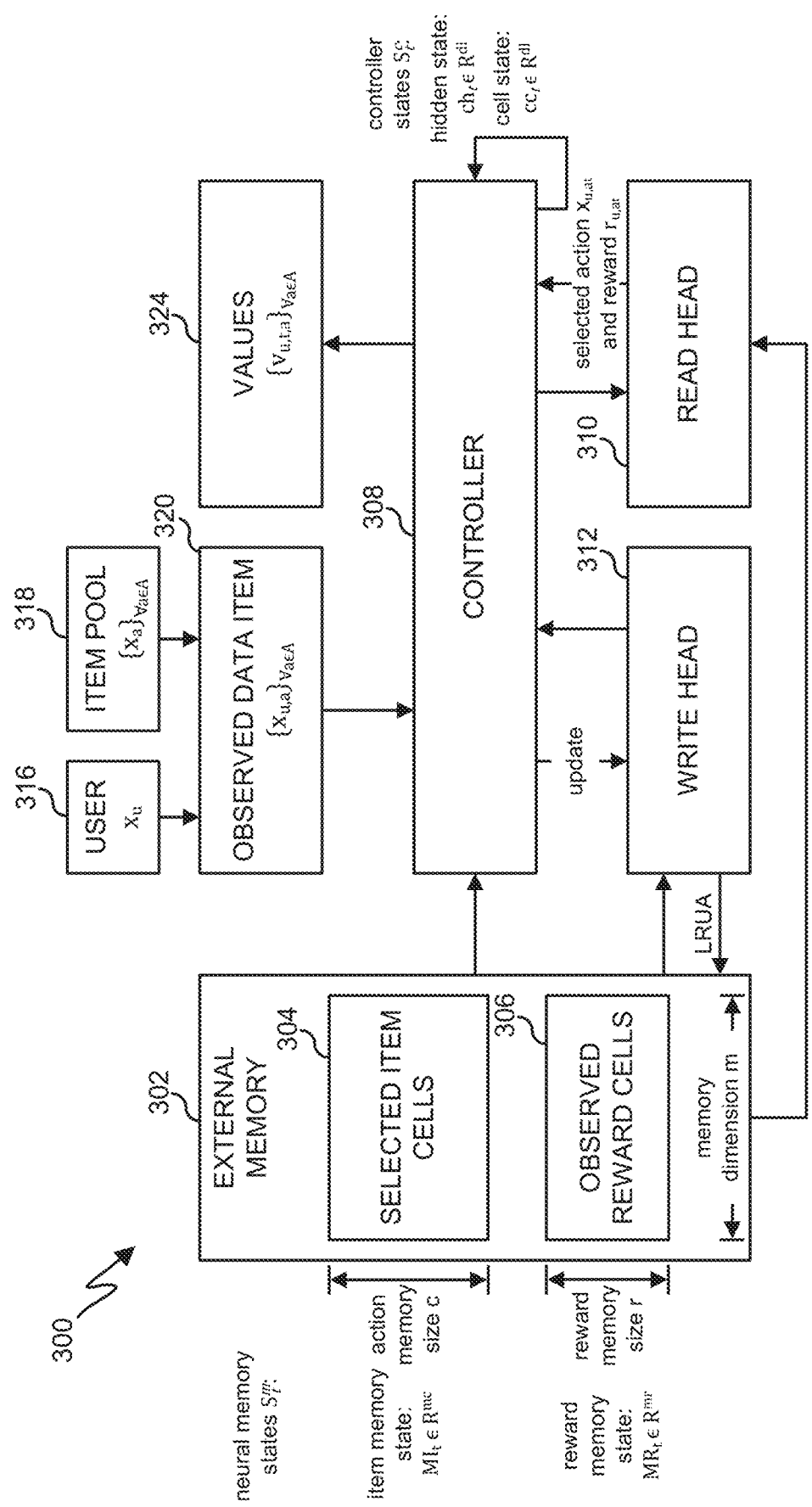

FIGS. 3A and 3B illustrate examples of a deep memory model 300 in accordance with various embodiments of this disclosure. The deep memory model 300 can be executed or otherwise used on one or more of the electronic devices 101, 102, 104, the server 106, and/or a processor such as the processor 120. However, the model 300 may be used by any other suitable device(s) and in any suitable system. The deep memory model 300 includes an external memory 302 for storing item or content data, reward data, and one or more of item or content memory states or reward states. In some embodiments, the external memory 302 can represent the personalized external memory 218 of FIG. 2. Also, in some embodiments, the model 300 models history states utilizing a Neural Turing Machine (NTM) as an end-to-end fully-differentiable architecture designed to extend the capabilities of neural networks by coupling them with the external memory 302. An NTM can quickly capture new information based on a memorized state in one-shot learning. An NTM can be used to treat the data either as a sequence or as a set.

As illustrated in FIG. 3B, the external memory 302 includes item cells 304 and reward cells 306. The items cells 304 include stored data based on previously-provided content processed by the model 300, and the reward cells 306 include reward data, such as a rating, label, user feedback, or other data, stored in association with certain content data. The item cells 304 store latent features of selected items, and the reward cells 306 store corresponding rewards. For example, if an image is provided as input into the model 300, detected features of the image can be stored in certain item cells 304 that are relevant to data on other images that share common features stored in other item cells 304. If a reward is also provided with the input image, such as a classification or label, the classification or label can be stored in the reward cells 306 and in association with the one or more item cells 304 that store data on the input image features. This allows the classification or label to later be retrieved from the external memory 302 and considered when a new input image sharing features with the previous input image is processed by the model 300.

The model 300 further includes or operates in conjunction with a controller 308 that is trained to understand and remember correlations between memory cells in the external memory 302. In some embodiments, the controller 308 can represent the trained operation model 216 of FIG. 2. In some embodiments, the controller 308 includes a deep neural network, such as a recurrent neural network (RNN), a long short-term memory (LSTM) network, or other type of network. The controller 308 controls at least one read head 310 and at least one write head 312 to retrieve and store data in the external memory 302. In some cases, the external memory 302 may include a memory dimension in, the item or action memory is of a size c, and the reward memory is of a size r. A history state $S_t$ at round t, which can be simplified as notation $S_t^u$ for a user u, can be modeled with an external memory state $S_t^m$ and a controller state $S_t^c$ that are updated as data is processed and stored in the external memory 302 by the model 300. At a timestamp t, a state $MI_t$ of the selected item cells 304 is defined as $MI_t \in R^{m \cdot c}$, and a state $MR_t$ of the observed reward cells 306 is defined as $MR_t \in R^{m \cdot r}$. The memory states continuously change and adapt to new data received by the model 300. The controller state $S_t^c$ represents a state of the controller 308 to guide interactions with the external memory 302.

When new data 314 is received by the model 300, the new data is initially processed and used to update a state of the controller 308. For example, in some embodiments and depending on the type of network included in the controller 308, the controller state $S_t^c$ of the controller 308 can include a cell state $cc_t \in R^{d \cdot l}$ and a hidden state $ch_t \in R^{d \cdot l}$. The controller states are updated as the read head 310 reads and retrieves data from the external memory 302. The data 314 can include content data and reward data.

Let $\mathcal{D}$ be an unknown probability distribution over $X^x[0,1]^{r \cdot K}$ for a space of all data X and a finite set of K actions A. The rewards of actions are in the interval [0,1]. The data 314 can be determined by an agent that observes a data item and chooses an action. At each timestamp t, the data 314 can include a combination of a user feature 316, $x_u$, of an observed user u and an item feature $x_a$ of an item a in an item pool 318, A, such that the item pool 318 provides $\{x_a\}_{\forall a \in A}$ for each timestamp. An observed data item 320 of $\{x_{u,a}\}_{\forall a \in A}$ is provided to the controller 308. Thus, a data item for the data 314 can be defined for each timestamp as follows:

$$x_t = \{x_{u_t,a}\}_{\forall a \in A} \quad (1)$$

Each user, organization, or entity having a personalized external memory corresponds to a context. Each item a is modeled as an action associated with a possible reward $r_{u,a}$ from the feedback of users $u_t$ such that, at each timestamp t, a dimensional reward $r_{u,a_t} \in [0,1]^r$ of the selection action $a_t$ can be provided. One possible goal of the model 300 can be to minimize the regret R(T) after T rounds, which can be defined as follows:

$$R(T) = \Sigma_{t=1}^T E \|r_{u,a_t^x} - r_{u,a_t}\|_2^2 \quad (2)$$

Here, $a_t^x$ is the optimal action in each round t. It will be understood that, in the various embodiments of this disclosure, user and context can be used interchangeably, and action and item can be used interchangeably.

The model 300 maintains the history state $S_t$ and uses the history state to decide which item to select in the next round. The history state can quickly learn to understand a user's preferences by remembering the features of diversely-explored items in a few interactions with the user. The model 300 effectively understands each user's personal preferences by selecting and observing a smaller number of actions of a large diversity during the first few iterations. In some embodiments, the model 300 can be shared between different users while maintaining each user's personal preference information in the latent history states in the external memory 302.

The model 300 is configured to output a reward prediction 322. In some embodiments, the reward prediction 322 includes values 324, which may be defined as $\{v_{u,t,a}\}_{\forall a \in A}$. In each round t, the model 300 takes the data $x_t$ and estimates a value $v_{t,a}$ for each item $a \in A$ based on the current history state $S_{t-1} = (S_{t-1}^m, S_{t-1}^c)$. The controller 308 operates the read head 310 to access the external memory 302 to select an item $a_t$ having shared features with the input and observes a reward $r_{u,a_t}$ associated with the item $a_t$ if available. The controller 308 also operates the write head 312 using the selected item $a_t$ and the observed reward $r_{u,a_t}$ to update the history state from $S_{t-1}$ to $S_t$. The write head 312 is configured to locate similar and dissimilar features in external memory cells compared to the input data and overwrite memory cells including the dissimilar features with the features from the new data, as well as writing or overwriting memory cells with any corresponding reward data for the new data. In some embodiments, a modified least recently used access (LRUA) process can be supported by the controller 308 or write head 312 to ensure that all empty memory cells are filled before overwriting any memory cells.

Although FIGS. 3A and 3B illustrate one example of a deep memory model 300, various changes may be made to FIGS. 3A and 3B. For example, some embodiments of the deep memory model 300 can forego or delay providing reward predictions, writing or overwriting data to be used in providing services at a later time or in response to an event. Also, in some embodiments, an input may not include reward data when initially provided to the model 300, and a reward can later be provided based on a request for or a confirmation of reward data from a user or other entity.

Figure 4:
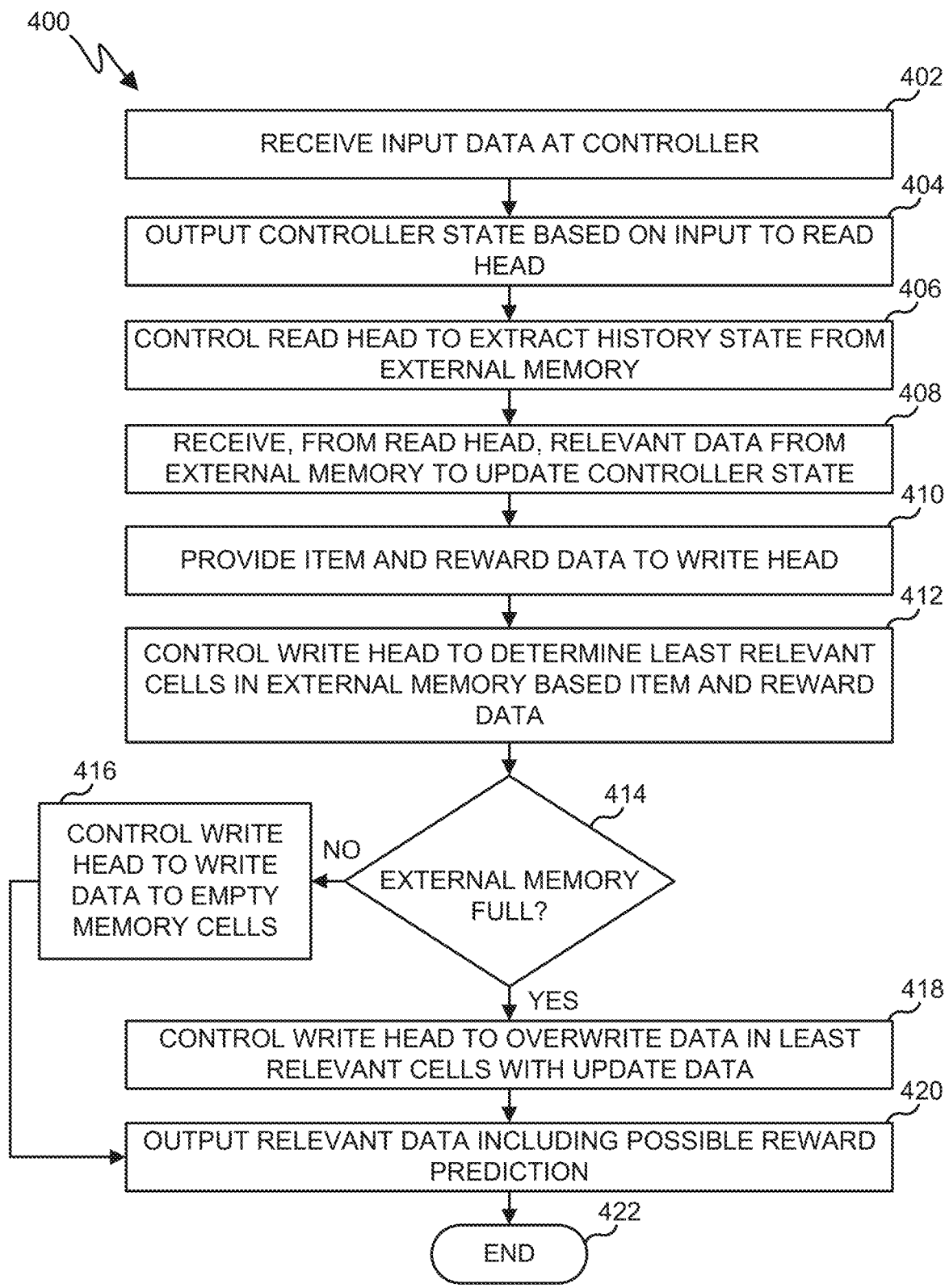
FIG. 4 illustrates an example controller process in accordance with various embodiments of this disclosure.

FIG. 4 illustrates an example controller process 400 in accordance with various embodiments of this disclosure. For ease of explanation, the process 400 may be described as being executed or otherwise used by the processor(s) 120 of any of the electronic devices 101, 102, 104 or the server 106 in FIG. 1. However, the process 400 may be used by any suitable device(s) and in any suitable system. The process 400 can be used with a deep memory model as described with respect to the various embodiments of this disclosure, such as the model 300.

At block 402, the processor receives, at a controller such as the controller 308, input data. In some embodiments, the input data is observed data, such as image data, language or utterance data, or other types of data, $x_t = \{x_{u,a}\}_{\forall a \in A}$ for a user u. At block 404, the processor outputs from the controller a controller state based on the input data to a read head, such as the read head 310. At block 406, the processor invokes or controls the read head to extract at least one history state from an external memory, such as the external memory 302, by retrieving data from memory cells of the external memory that are relevant to or have features in common with the new input data. At block 408, the processor receives at the controller the history state from the read head, as well as a possible reward $r_{u,a_t}$ associated with the item $a_t$. In some embodiments, the controller can include a neural network, such as an LSTM network. In each round t, the controller state $S_t^c$ can include a hidden state $ch_t$ and a cell state $cc_t$, where the controller state behaves as a conveyor belt over time, updating the controller state at each round t.

At block 410, the processor via the controller provides input data, such as the selected item $x_{u,a}$ and the associated reward data $r_{u,a}$. At block 412, the processor invokes the write head to determine the least relevant cells in external memory based on the input data. At decision block 414, the processor determines if the external memory is full. If not, the process 400 moves to block 416, where the processor controls the write head to write update data to empty cells in the external memory in order to update the history state $S_t^m$ of the external memory. The processor also updates the controller state $S_t^c$. The process 400 then moves to block 420. If the processor determines that the external memory is full at decision block 414, the process 400 moves to block 418, where the processor controls the write head to overwrite data in cells that are determined to be the least relevant to the input data with updated data in order to update the history state $S_t^m$ of the external memory. The processor also updates the controller state $S_t^c$. The process 400 then moves to block 420.

In some embodiments in which the controller includes an LSTM network, the processor can update the controller at each round t as follows:

$$\begin{pmatrix} i \\ f \\ o \\ g \end{pmatrix} = \begin{pmatrix} \text{sigmoid} \\ \text{sigmoid} \\ \text{sigmoid} \\ \tanh \end{pmatrix} \begin{pmatrix} W_i^l \\ W_f^l \\ W_o^l \\ W_c^l \end{pmatrix} \begin{pmatrix} Z \\ ch_{t-1}^l \end{pmatrix} + b_h \quad (3)$$

$$cc_t^l = f \odot cc_{t-1}^l + i \odot g$$

$$ch_t^l = o \odot \tanh(cc_t^l)$$

Here, $cc_{t-1}$ and $ch_{t-1}$ are obtained from saved controller states at a previous iteration t−1. Also, i, f, and o are input gates, forget gates, and output gates respectively. Further, $W_i^l$, $W_f^l$, $W_o^l$, and $W_c^l$ are the weights of layer l in the neural network. In addition, $\odot$ represents element-wise multiplication, and Z represents an input such that $Z = h_{t-1}^l$ for a stacked deep layer of the neural network. In some embodiments, for a first layer of the neural network, the input $Z = x_{u,a}$ and can be defined as follows for an input item a of a user u and reward $r_{u,a}$ at a round t:

$$Z = x_{u,a} \oplus r_{u,a} \quad (4)$$

Here, $\oplus$ represents vector concatenation. In some embodiments, when a reward $r_{u,a}$ is not included in the input, $r_{u,a} = 0$.

At block 420, the processor outputs the relevant data received from the read head, including a possible reward prediction. In some embodiments, the processor uses the observed data to estimate the values $\{v_{u,t,a}\}$ of each item a to predict a reward for the input data received in block 402. For example, if the input data received in block 402 is image data, the processor can invoke the read head to determine relevant cells in which data on other images having features in common with the input image is stored. The data from the relevant cells and any associated reward data are provided by the read head, and the processor via the controller predicts a label or classification of the input image based on the common features and associated rewards of image data previously stored in the external memory. In some embodiments in which no reward data has been stored or provided, the processor can use the data in the external memory to retrieve previously-processed images that are similar to the new input image and provide those similar images as an output to a user. As another example, the external memory can include stored data on search or recommendation history. For example, the stored data can include previously-provided utterance or natural language data. When a new search is performed with similar utterance features to the stored data, the processor can extract history data from the external memory and predict the types of search results the user is predisposed to receive. In some embodiments, the user can then provide reward data such as feedback to the model, such as an input that filters the results. Based on the reward data, the processor can provide updated search results while remembering the filter input for future search queries. The process 400 ends at block 422.

Although FIG. 4 illustrates one example of a controller process 400, various changes may be made to FIG. 4. For example, while shown as a series of steps, various steps in FIG. 4 can overlap, occur in parallel, occur in a different order, or occur any number of times. As a particular example, in some embodiments, block 420 can occur before blocks 412-418, thereby providing an output such as a reward prediction before the new data is written to the external memory. Also, it will be understood that multiple rounds t can be performed to determine the reward prediction, which may include repeating blocks 404-418.

Figure 5:
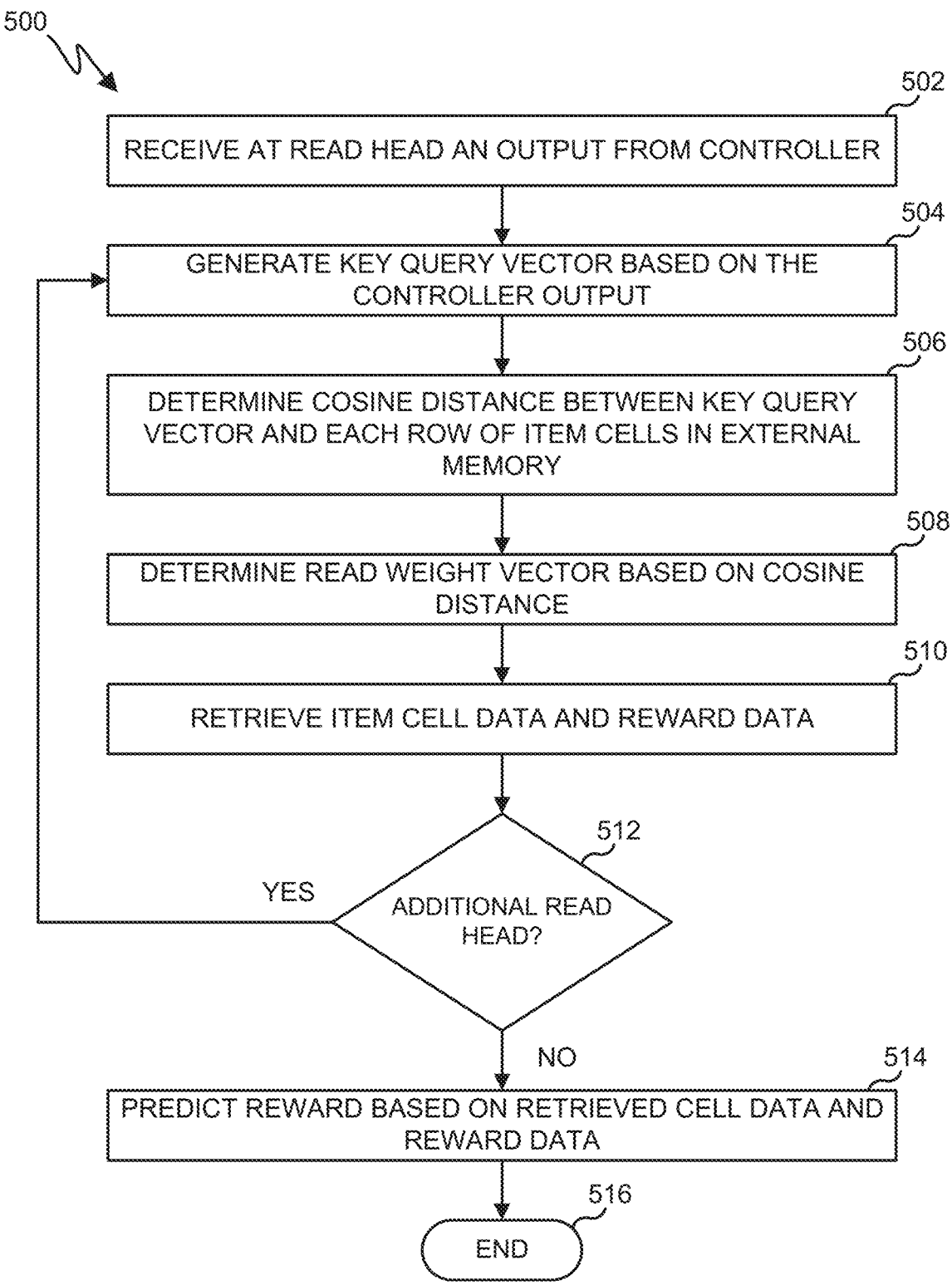
FIG. 5 illustrates an example read head process in accordance with various embodiments of this disclosure.

FIG. 5 illustrates an example read head process 500 in accordance with various embodiments of this disclosure. For ease of explanation, the process 500 may be described as being executed or otherwise used by the processor(s) 120 of any of the electronic devices 101, 102, 104 or the server 106 in FIG. 1. However, the process 500 may be used by any suitable device(s) and in any suitable system. The process 500 can be used with a deep memory model as described with respect to the various embodiments of this disclosure, such as the model 300.

At block 502, the processor receives at a read head, such as the read head 310, an output, such as output $ch_t$, from a controller associated with a model, such as the controller 308 associated with the model 300. In some embodiments, one possible goal of the read head is to address the external memory and fetch item and reward memory states, $ri_t$ and $rr_t$, respectively. The processor, via the read head, uses the item state and reward state to estimate values of an item $d_t$. At block 504, the processor generates a key query vector with respect to the output, such as the output $ch_t$, received from the controller in block 502. In some embodiments, the key query vector $k_t$ can be defined as follows:

$$k_t^c = \tan h(W_k^c ch_t) \qquad (5)$$

At block 506, the processor determines a cosine distance K between the key query vector $k_t^c$ and each row of item cells in the external memory, which can be defined as follows:

$$K(k_t^c, MI_t(i)) = \frac{k_t^c \cdot MI_t(i)}{\|k_t^c\| \|MI_t(i)\|} \qquad (6)$$

At block 508, the processor determines a read weight vector $w_t$ based on the cosine distance and calculated, in some embodiments, using the softmax function over the cosine distance. The read weight vector can be defined as follows:

$$w_t^r(i) = \frac{\beta_t \exp K(k_t^c, MI_t(i))}{\sum_j \beta_t \exp K(k_t^c, MI_t(j))} \qquad (7)$$

Here, $\beta_t$ is a positive key strength that can amplify or attenuate the precision of the focus and can be defined as follows:

$$\beta_t = \log\left(\exp\left(W_{\beta_{ch_t}}\right) + 1\right) \qquad (8)$$

In some embodiments, $\beta_t \geq 1$ for any t.

After determining the controlling read weight vector $cw_t^r$ at block 508, the process 500 moves to block 510, where the processor retrieves the item state $ri_t$ and reward state $rr_t$. The retrieval of the item state $ri_t$ and reward state $rr_t$ can be defined as follows:

$$ri_t = w_t^{r^T} MI_t, rr_t = w_t^{r^T} MR_t \qquad (9)$$

In some embodiments, there can be more than one read head included in the model. At decision block 512, the processor determines if there is more than one read head in the model. If not, the process 500 moves on to block 514. Otherwise, the process 500 moves back to block 504 to generate another key query vector. When there is more than one read head, a key query vector $k_t^c(i)$ can be learned for each read head i, and the item state $ri_t$ and the reward state $rr_t$ can be set as $\Sigma_i ri_t(i)$ and $\Sigma_i rr_t(i)$, respectively. At block 514, the processor predicts a reward based on the retrieved cell data and any associated reward data. In some embodiments, the prediction can be a linear projection from the output of reward memory provided by the read head for a data item $d_t$:

$$r_{d_t} = W_o rr_t \qquad (10)$$

In some embodiments, when there is no stored reward data, such as if previously-provided data was not provided with associated rewards, $rr_t$ can be set to 0. When no reward data is stored in the external memory, the processor can provide other output data, such as outputting the content associated with the relevant item data stored in external memory, like images including common features with new input data provided to the model. The process 500 ends at block 516.

Although FIG. 5 illustrates one example of a read head process 500, various changes may be made to FIG. 5. For example, while shown as a series of steps, various steps in FIG. 5 can overlap, occur in parallel, occur in a different order, or occur any number of times. As a particular example, in some embodiments, the reward prediction in block 514 can occur before or after an overwriting, operation of a write head that updates the external memory with new data. Also, in some embodiments, the process can also determine whether the external memory is empty and, if so, perform a writing step with a write head in lieu of the process 500 (since the external memory does not include any data to read) and later performing the process 500 after at least one round of data is stored in the external memory.

Figure 6:
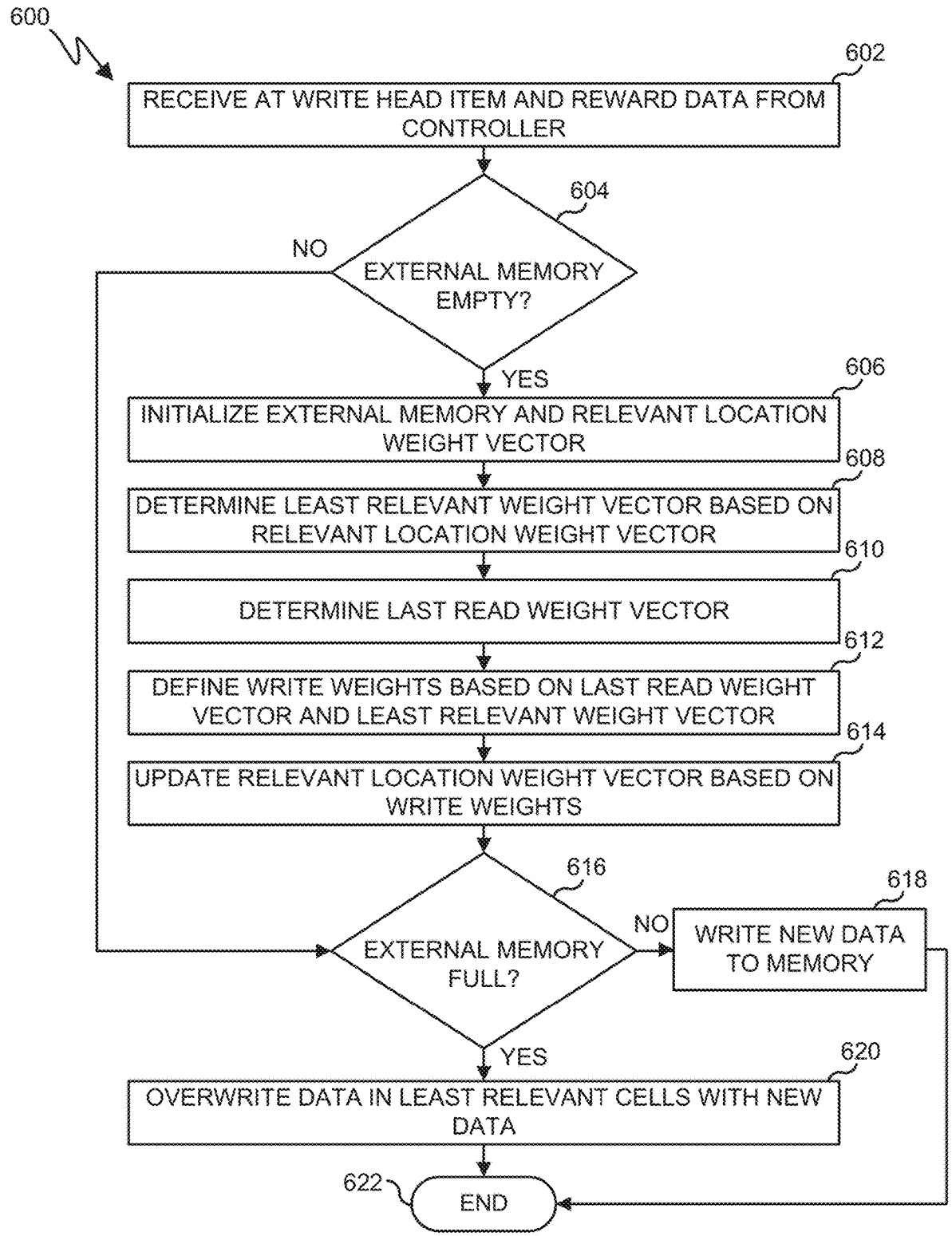
FIG. 6 illustrates an example write head process in accordance with various embodiments of this disclosure.

FIG. 6 illustrates an example write head process 600 in accordance with various embodiments of this disclosure. For ease of explanation, the process 600 may be described as being executed or otherwise used by the processor(s) 120 of any of the electronic devices 101, 102, 104 or the server 106 in FIG. 1. However, the process 600 may be used by any suitable device(s) and in any suitable system. The process 600 can be used with a deep memory model as described with respect to the various embodiments of this disclosure, such as the model 300.

At block 602, the processor receives at a write head, such as the write head 312, item and reward data from a controller, such as the controller 308. At decision block 604, the processor determines if external memory, such as the external memory 302, is empty. If, for example, the model receives data for a user for the first time, the external memory may not have any data stored yet for that user. If the processor determines that the external memory is not empty at block 606, the process 600 moves on to decision block 616. If the processor determines the external memory is empty at block 606, the process moves to block 606. At block 606, the processor initializes the external memory cells as all 0 values and initializes or sets a relevant location weight vector. In some embodiments, the processor uses a modified LRUA process to ensure that memory cells in the external memory are not overwritten until no memory rows are empty. LRUA addresses the write locations by balancing the most relevant read location with the least recently used location, such that the external memory is kept up-to-date and diverse. At a first round t, the most relevant location weights $w_t^u$ can be set as follows:

$$w_{t=0}^u = (0, 0, \ldots, 0) \qquad (11)$$

The size of $w_{t=0}^u$ is the number of rows m in the external memory.

At block 608, the processor determines the least relevant weights based on the most recently read location weight vector. The least relevant weights $w_{t-1}^{lr}$ can be defined as follows:

$$w_{t-1}^{lr}(i) = \begin{cases} 0 & \text{if } w_{t-1}^r(i) > m(w_{t-1}^r, n) \\ 1 & \text{if } w_{t-1}^r(i) \leq m(w_{t-1}^r, n) \end{cases} \qquad (12)$$

Here, $m(w_{t-1}^r, n)$ denotes the $n^{th}$ smallest element of the vector $w_{t-1}^r$, n is the number of read heads, and $m(w_{t-1}^r, n)$ indicates the n least relevant data cells. In order to ensure that the external memory is filled before overwriting the non-empty rows of the external memory, the processor determines or sets a last read weight vector $w_{t-1}^{rr}$ at block 610. The last read weight vector $w_{t-1}^{rr}$ can be defined as follows:

$$w_{t-1}^{rr}(i) = \begin{cases} 0 & \text{if } w_{t-1}^u(i) \leq m(w_{t-1}^u, n) \text{ and } w_{t-1}^u(i) = 0 \\ w_{t-1}^u(i) & \text{otherwise} \end{cases} \quad (13)$$

Initially, $w_{t=0}^r = 0$.

At block 612, the processor defines write weights $w_t^w$ based on the last read weight vector and the least-used weight vector. The write weights $w_t^w$ can be defined as a convex combination with a trainable sigmoid gate as follows:

$$w_t^w = \text{sigmoid}(a)w_{t-1}^{rr} + (1 - \text{sigmoid}(a))w_{t-1}^{wlr} \quad (14)$$

Once the processor determines the write weights $w_t^w$, the processor updates the relevant location weight vector $w_t^u$ based on the write weights $w_t^w$ at block 614, which can occur as follows:

$$w_t^u = w_{t-1}^u + w_t^w \quad (15)$$

At decision block 616, the processor determines if the external memory is full. If not, the processor writes the new data received by the model into empty memory cells in the external memory at block 618. The process 600 then ends at block 622. If the processor determines that the external memory is full at decision block 616, the process 600 moves to block 620, where the processor overwrites data in the least relevant or least used memory cells with the new data received by the model. When writing to the external memory using the write head, the processor updates the item and reward memory states by erasing and writing into locations using write weights $w_t^w$. In an erasing phase, the processor can update the item data in memory as follows:

$$MI_t = MI_{t-1} \odot [(1 - w_t^w) \otimes 1] \quad (16)$$

During the erasing phase, the processor can update the reward data in memory as follows:

$$MR_t = MR_{t-1} \odot [(1 - w_t^w) \otimes 1] \quad (17)$$

In the writing phase of the overwriting process, the processor can update the item data in memory as follows:

$$MI_t = MI_{t-1} + w_t^w \otimes k_t^c \quad (18)$$

Also, during the writing phase, the processor can update the reward data in memory as follows:

$$MR_t = MR_{t-1} + w_t^w \otimes k_t^r \quad (18)$$

The processor overwrites the item data and reward data to memory in this manner for each cell i in external memory. Here, $k_t^r$ is a key query vector output by the controller and can be defined as follows:

$$k_t^r = \tan h(W_k^r ch_t) \quad (19)$$

Once the processor writes new data to the external memory, the process 600 ends at block 622.

Although FIG. 6 illustrates one example of a write head process 600, various changes may be made to FIG. 6. For example, while shown as a series of steps, various steps in FIG. 6 can overlap, occur in parallel, occur in a different order, or occur any number of times. As a particular example, in some embodiments, the weights used to determine in which cells to write data may have already been determined, and the processor can thus take new input and state data and write the data to external memory based on the previously-determined weights. Also, in some embodiments, the determination as to whether the memory is full may be skipped as, in some cases, subsequent overwrites may not create empty cells once the memory is filled for the first time (since cells may not be erased without being subsequently overwritten).

Figure 7:
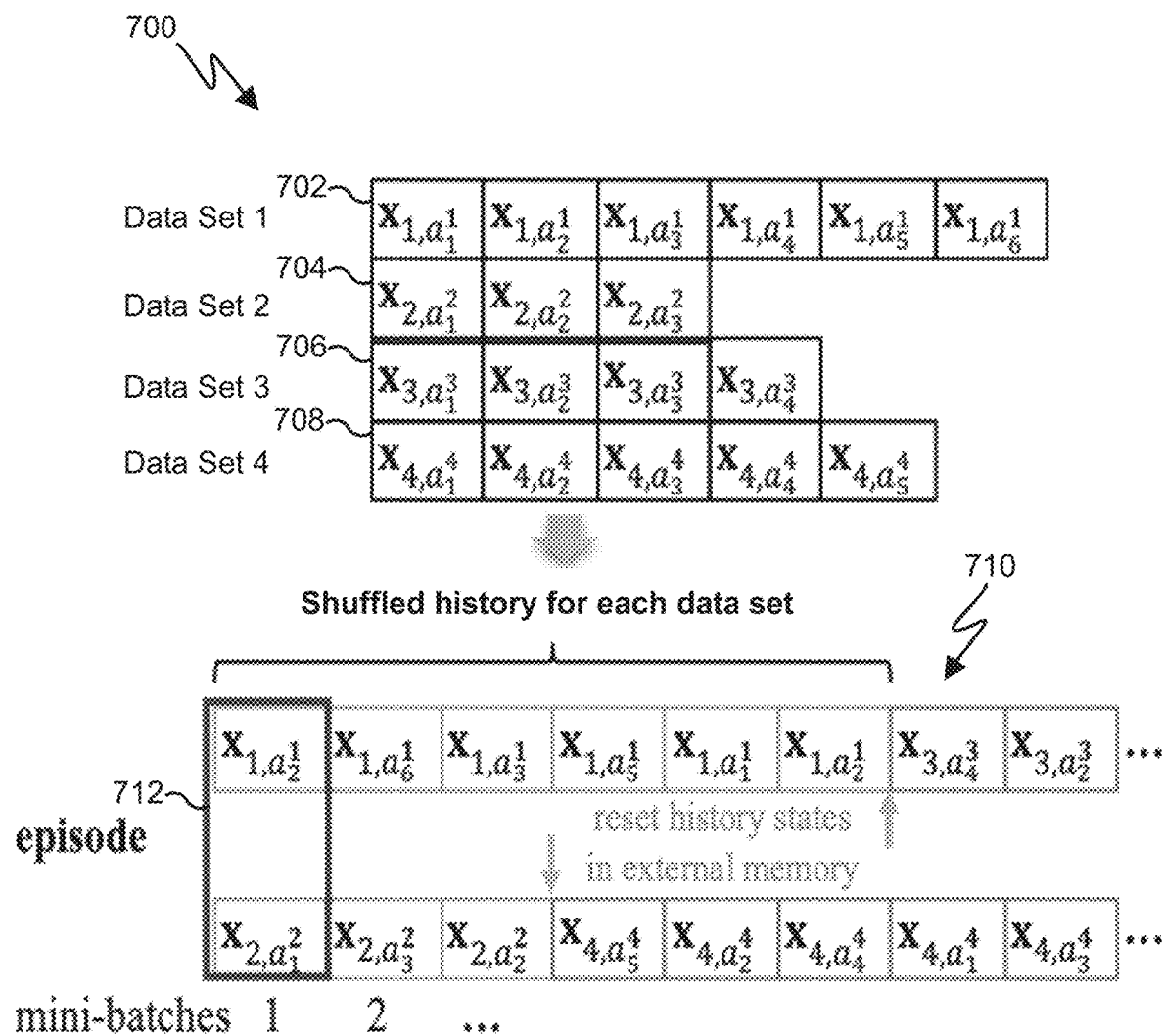
FIG. 7 illustrates an example offline training process in accordance with various embodiments of this disclosure.

FIG. 7 illustrates an example offline training process 700 in accordance with various embodiments of this disclosure. For ease of explanation, the process 700 may be described as being executed or otherwise used by the processor(s) 120 of any of the electronic devices 101, 102, 104 or the server 106 in FIG. 1. However, the process 700 may be used by any suitable device(s) and in any suitable system. The process 700 can be used with a deep memory model as described with respect to the various embodiments of this disclosure, such as the model 300. The offline training process 700 uses a plurality of data sets to train a deep memory model, such as the model 300. The offline training process 700 utilizes a large amount of history data included in the plurality of data sets to train the model on previously-selected items and observed rewards. Since the external memory can store different data for different users, organizations, or other entities, the offline training process 700 trains the read and write capabilities of the model such that the model can later be used to efficiently store previous interactions and data to learn user preferences.

In this example of the process 700, the plurality of data sets includes a first data set 702, a second data set 704, a third data set 706, and a fourth data set 708. Each data set 702, 704, 706, 708 includes a history state of an item a. For example, the first data set 702 includes a history state of $x_{1,a_1}^1$, $x_{1,a_2}^1$, and so on, where $x_1$ indicates that the history state is of the first data set 702 or for a first user and $a_1^1$ indicates, for example, the history state is for a first item of the first data set. The plurality of data sets is combined to create episodes to be used for training the model. In some embodiments, to create an episode, the data sets are shuffled or concatenated into an episode and two or more states from the data sets are added to a mini-batch, with a plurality of mini-batches included in the episode.

As an example, as shown in the process 700, the first, second, third, and fourth data sets 702, 704, 706, 708 are shuffled such that two groups of data sets are included in an episode 710. The first group of data sets of the episode 710 includes the history states from the first data set 702, shuffled such that the second history state of the first data set 702 will be included in a first mini-batch 712, the sixth history state of the first data set 702 will be included in a second mini-batch, and so on. In the first group of data sets, the third data set 706, shuffled, follows after all of the history states of the first data set 702. The second group of data sets of the episode 710 starts with the first history state of the second data set 704, the third history state of the second data set 704, and so on. In the second group of data sets, the fourth data set 708, shuffled, follows after all of the history states of the second data set 704.

As shown in the process 700, the history states of each of the data sets 702, 704, 706, 708 are shuffled within that data set such that the history states of a data set remain grouped together in the same data set, only in a shuffled order. In some embodiments, this way of grouping the data sets is done so that at least a portion of the training data shares common features and so that the model can learn from these common features. For example, in the example of the process 700, the first data set 702 and the second data set 704 share common features and the third data set 706 and the fourth data set 708 share common features, and the episode is created such that at least the first few mini-batches include history states from the first data set 702 and the history states from the second data set 704. As shown in FIG. 7, in a situation where a data set sharing common features with another data set includes less history states than the other data set (since the second data set 704 has fewer history states than the first data set 702), mini-batches can also be created that include history states that do not share common features, such as the fourth mini-batch in FIG. 7 that includes a history state from the first data set 702 and a history state from the fourth data set 708. Once all history states of a data set have been used to train the model in a mini-batch, the history states of the external memory and/or the controller can be reset or reinitialized so that the past history states do not affect the training with the new history states of the next data set.

Each episode used for training can have a fixed length L, and model parameters can be updated at the end of each episode. In some embodiments, a new episode using the same training data can then be created, such as by shuffling and/or concatenating the data sets into different orders and groupings than the previous episode. Also, in some embodiments, the history states for each data set can be concatenated to form each episode of a mini-batch by reinitializing history states for every new user. At the beginning of each epoch, B (size of mini-batch) data sets or users are randomly selected among all unselected users. In each episode, after reshuffling and adding the selected items for one user, items for a new user can be concatenated afterwards, with reinitialized history states in external memory cells and controller states. In each iteration of training, the value of a selected item is estimated based on the previous history state. At the end of each episode, the model parameters are updated with a loss function, which can be defined as follows:

$$L_2\text{loss}: \mathcal{L}_{offline} = \frac{1}{B}\sum_{t=1}^{L}\sum_{b=1}^{B}\|r_{b,t} - v_{b,t}\|_2^2 \qquad (20)$$

Here, $r_{b,t}$ is the ground truth value or observed reward, and $v_{b,t}$ is the predicted value of the $i^{th}$ item in the $b^{th}$ sample of a mini-batch. A training epoch finishes when all training data is selected, and K epochs can be run in total. To begin a new training epoch, the data sets and the associated history states can be shuffled again, and the process is repeated.

Although FIG. 7 illustrates one example of an offline training process 700, various changes may be made to FIG. 7. For example, although each mini-batch illustrated in FIG. 7 includes two history states for simplicity, each mini-batch can include any number of history states. Also, any number of data sets can be used. In some embodiments, online training (as described below) can be performed in addition to offline training in order to train the model on policy learning, such as on how to select items in each round.

Figure 8:
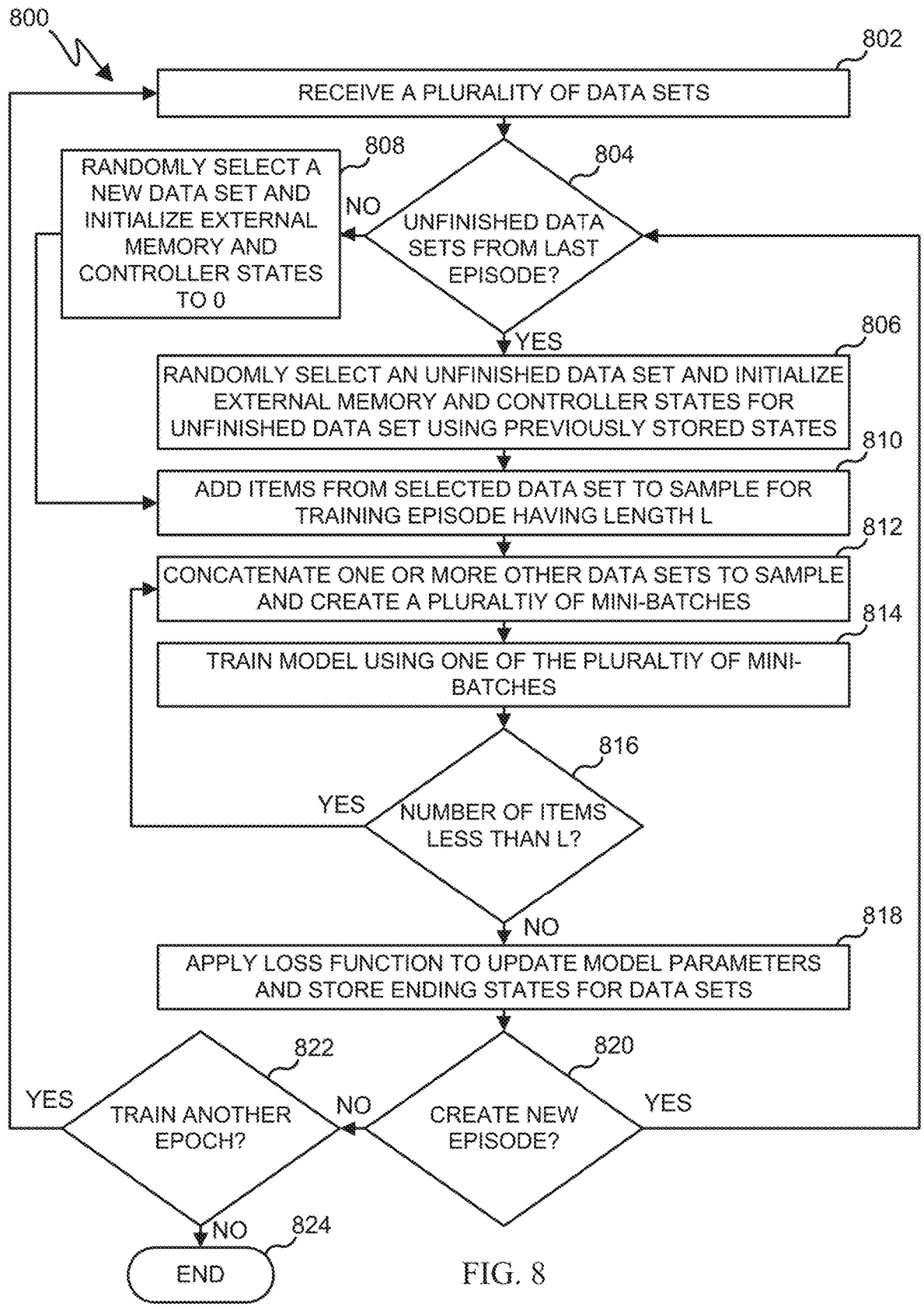
FIG. 8 illustrates another example offline training process in accordance with various embodiments of this disclosure.

FIG. 8 illustrates an example offline training process 800 in accordance with various embodiments of this disclosure. For ease of explanation, the process 800 may be described as being executed or otherwise used by the processor(s) 120 of any of the electronic devices 101, 102, 104 or the server 106 in FIG. 1. However, the process 800 may be used by any suitable device(s) and in any suitable system. The process 800 can be used with a deep memory model as described with respect to the various embodiments of this disclosure, such as the model 300.

At block 802, the processor receives a plurality of data sets each including history states to be used for training a model. At decision block 804, the processor determines whether there are any unfinished data sets from a previous episode that include history states that have not yet been used for training. If so, at block 806, the processor randomly selects one of the unfinished data sets to be used in the episode and initializes the external memory and controller states of the model using previously-stored states for the unfinished data set. The process then moves to block 810. If the processor determines that there is no unfinished data set from the previous episode at decision block 804, the processor randomly selects a new data set and initializes the external memory and controller states at block 808, such as by setting the external memory and controller states to 0. The process 800 then moves to block 810.

At block 810, the processor adds items from the data set randomly selected in either block 806 or 808 to a sample for a training episode, where the training episode has a length L. At block 812, the processor concatenates one or more other data sets to the sample created in block 810 and creates a plurality of mini-batches from among the history states of the concatenated data sets. In some embodiments, the one or more data sets concatenated to the sample can also be randomly selected in a similar manner as in blocks 804-808. At block 814, the processor trains the model using the created plurality of mini-batches. For each mini-batch, the processor operates the model to estimate item values for each mini-batch. At decision block 816, the processor determines if a number of history states in the episode is less than L, which is the length of the episode. If so, the process moves back to block 812 to concatenate one or more data sets to the sample, and more mini-batches are created. Since the data sets can include differing numbers of history states, concatenating more data sets to the episode sample helps to ensure that new mini-batches are created when a data set is fully processed. When a last history state of each data set is used, the processor can also reset or reinitialize the external memory and controller states before continuing training with the next mini-batch that includes one or more history states from a new data set.

If the processor determines that the number of items in the episode is not less than L at decision block 816, the processor can train the model using any remaining mini-batches up to the length L. The process 800 then moves to block 818. In some embodiments, the processor tracks the number of items used for training until reaching the length L. The process 800 then moves to block 818, where the processor applies a loss function, such as the $\mathcal{L}_2$ loss function of Equation (20) above, to update parameters of the model. The processor then stores ending states for the data sets. In some embodiments, the stored ending states are used if there are unfinished data sets as in blocks 804 and 806. At decision block 820, the processor determines if a new episode is to be created. In some embodiments, the processor determines that a new episode is to be created when there are data sets left that have not been used yet for training after reaching the episode length L or when there are unfinished data sets. If the processor determines to create a new episode after reaching the episode length L, the process 800 moves back to block 804. If the processor determines that no new episode is to be created at decision block 820, the process 800 moves to decision block 822, where the processor determines whether to train the model in another epoch, such as by determining if a number of training epochs has reached K epochs. If the processor determines to begin a new training epoch, the process 800 moves back to block 802 to begin a new epoch with the plurality of data sets. If the processor determines to not perform further training, the process 800 ends at block 824.

Although FIG. 8 illustrates one example of an offline training process 800, various changes may be made to FIG. 8. For example, while shown as a series of steps, various steps in FIG. 8 can overlap, occur in parallel, occur in a different order, or occur any number of times. As a particular example, in some embodiments, the decision block 816 can occur before block 814, such that the length L for the episode is achieved before any mini-batches are used for training. Also, in some embodiments, more than one mini-batch can be used in block 812 for training before reaching decision block 816, such as training using each created mini-batch, determining if the number of items in the episode used for training so far is less than L, and then concatenating more data sets.

Figure 9:
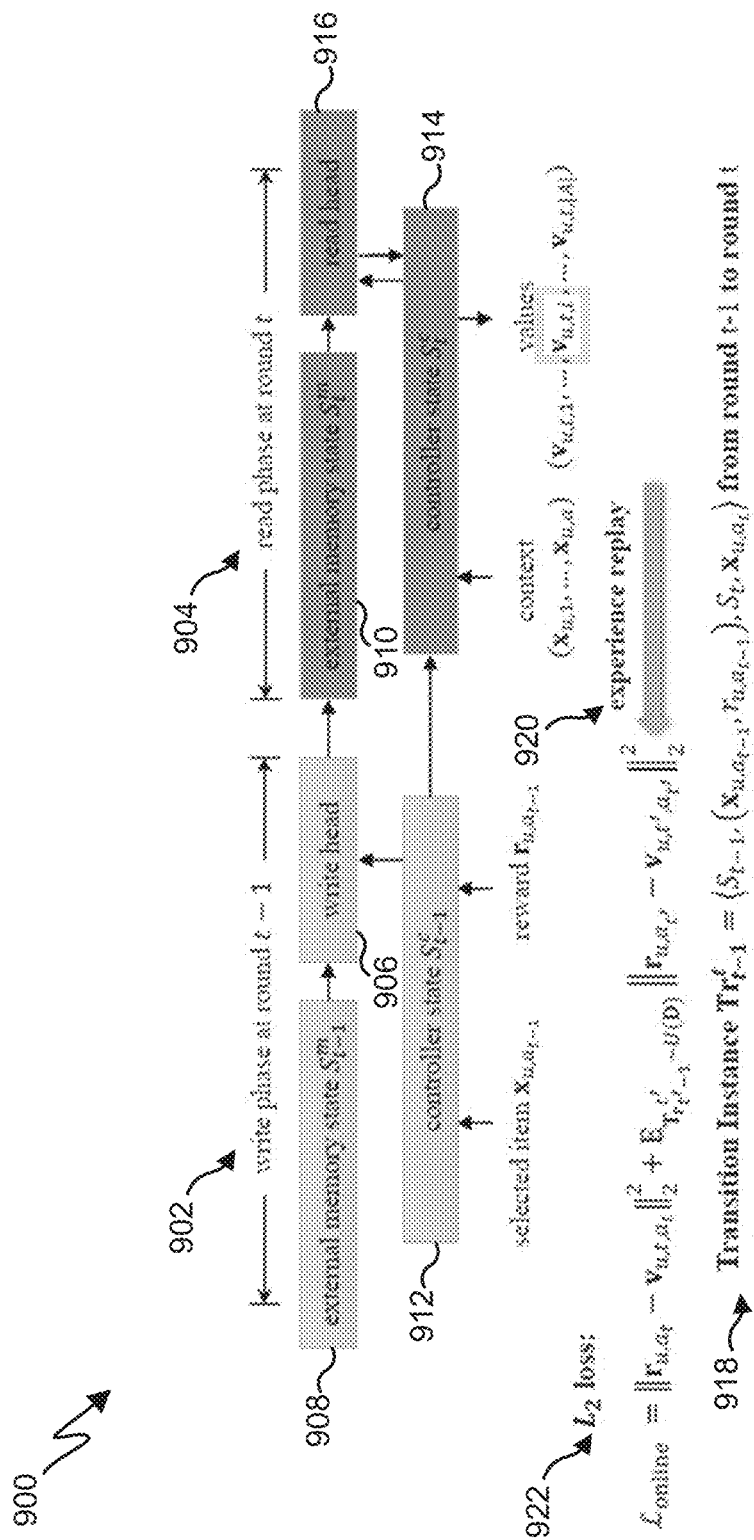
FIG. 9 illustrates an example online training process in accordance with various embodiments of this disclosure.

FIG. 9 illustrates an example online training process 900 in accordance with various embodiments of this disclosure. For ease of explanation, the process 900 may be described as being executed or otherwise used by the processor(s) 120 of any of the electronic devices 101, 102, 104 or the server 106 in FIG. 1. However, the process 900 may be used by any suitable device(s) and in any suitable system. The process 900 can be used with a deep memory model as described with respect to the various embodiments of this disclosure, such as the model 300. Since history states stored in external memory are independent of the offline model training used to train the model on how to read from and write to external memory, online training can be performed for the model with continuously-updated states.

As illustrated in FIG. 9, the process 900 includes one or more transition instances that start with a write phase 902 at round t−1 and end with a read phase 904 at round t. In the write phase 902, when a reward $e_{u,a_{t-1}}$ is observed for a selected item $a_{t-1}$ at round t−1, the controller invokes a write head 906 to update the external memory state 908, $s_{t-1}^m$, to an updated external memory state 910, $S_t^m$. The controller updates a controller state 912, $S_{t-1}^c$, to an updated controller state 914, $S_t^c$. With the updated external memory state 910 and the updated controller state 914, new data $\{x_{u,a}\} a \in A$ is observed to start round t. The controller invokes a read head 916 to estimate values of items and any associated rewards. In some embodiments, an item and an associated reward can be selected from the new data. An observed reward $r_{u,a_t}$ is used to label a transition instance 918 as $\text{Tr}_{t-1}^t$, and the transition instance can be defined as follows from round t−1 to round t:

$$Tr_{t-1}^t = \langle S_{t-1}(x_{u,a_{t-1}}, r_{u,a_{t-1}}), S_p x_{u,a_t} \rangle \quad (21)$$

The online training process 900 includes taking, in each round t, a pair of a selected item and an observed reward $(x_{u,a_{t-1}}, r_{u,a_{t-1}})$ from the previous round as input to update the memory and controller states using the write head 906. With the new states, the read head 916 is invoked to estimate the value $v_{u,t,a}$ of each item a.

At the end of each round t, the transition instance $\text{Tr}_{t-1}^t$ between each round t−1 and t is constructed, and $r_{u,a_t}$ is assigned to the label of $\text{Tr}_{t-1}^t$. $\text{Tr}_{t-1}^t$ is stored in a reply buffer, denoted as D, and is used with a sampled transition instance in D for an experience replay 920 to fine-tune the model by minimizing $L_2$ loss using a loss function 922. The loss function 922 can be defined as follows:

$$\mathcal{L}_{online} = \|r_{u,a_t} - v_{u,t,a_t}\|_2^2 + E_{T_{r'-1}^{t'} \sim U(D)} \|r_{u,a_{t'}} - v_{u,t',a_{t'}}\|_2^2 \quad (22)$$

Although FIG. 9 illustrates one example of an online training process 900, various changes may be made to FIG. 9. For example, in some embodiments, the selected item in the second round can be selected randomly.

Figure 10:
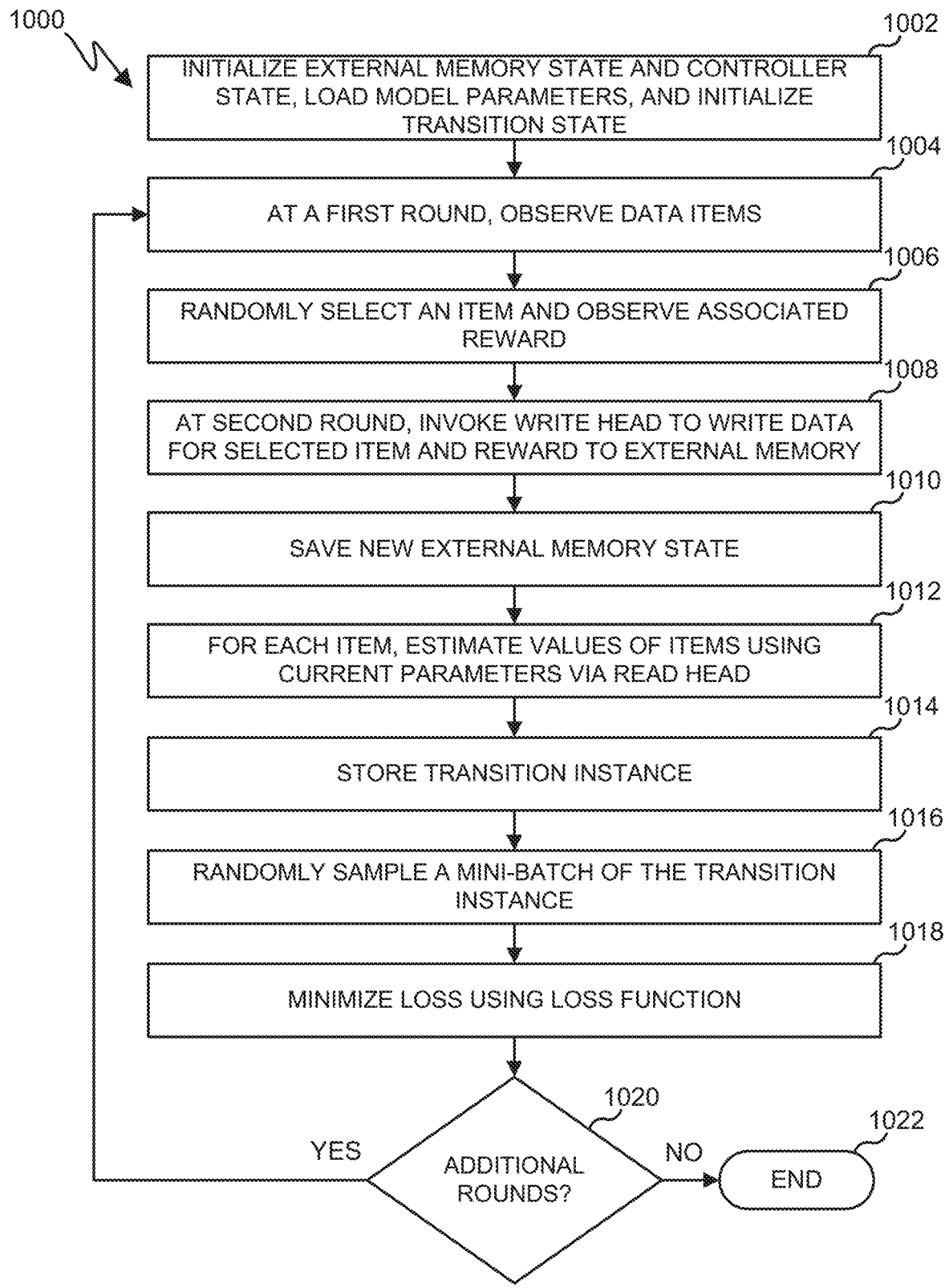
FIG. 10 illustrates another example online training process in accordance with various embodiments of this disclosure.

FIG. 10 illustrates an example online training process 1000 in accordance with various embodiments of this disclosure. For ease of explanation, the process 1000 may be described as being executed or otherwise used by the processor(s) 120 of any of the electronic devices 101, 102, 104 or the server 106 in FIG. 1. However, the process 1000 may be used by any suitable device(s) and in any suitable system. The process 1000 can be used with a deep memory model as described with respect to the various embodiments of this disclosure, such as the model 300.

At block 1002, the processor initializes an external memory state $S_t^m$ and a controller state $S_t^c$ of a model and loads parameters θ from an offline pre-trained model, such as that described with respect to FIGS. 7 and 8. The processor also initializes a transition state for the model. At block 1004, in a first round t, the processor observes data, such as $\{\{x_{u,a}\}\}_{\forall a \in A}$ of all items a∈A, provided by a user or data set. At block 1006, the processor randomly selects an item and observes a reward associated with the item. At block 1008, in a second round t, the processor invokes a write head, such as the write head 312, and writes data for the item and reward selected in block 1006 to external memory. As an example, in each round, the processor can write a tuple of the selected item and observed reward in the previous round to external memory. At block 1010, the updated external memory state is saved. A controller state can also be updated accordingly.

At block 1012, for each item a∈A, the processor, invoking the read head, estimates the values $v_{u,t,a}$ using the current model parameters θ. At block 1014, the processor stores an updated transition instance. At the end of each round t, the transition instance $\text{Tr}_{t-1}^t$ between each round t−1 and t is constructed, and $r_{u,a_t}$ is assigned to the label of $\text{Tr}_{t-1}^t$. Also, $\text{Tr}_{t-1}^t$ is stored in a replay buffer D. At block 1016, the processor randomly samples a mini-batch $B_t$ of the transition instance from the reply buffer D. At the end of each item selection, the processor updates the model via an experience replay by using the current transition along with B−1 randomly-sampled transitions from the previous rounds. The sampled transition instance is used for the experience replay to fine-tune the model. At block 1018, the processor minimizes the $L_7$ loss using a loss function, such as the loss function of Equation (22). At decision block 1020, the processor determines whether additional rounds are to be performed by the model. If so, the process 1000 moves back to block 1004. If not, the process 1000 ends at block 1022. The online training process 1000 thus further fine-tunes the model for each specific entity, such as a user, organization, or automated system, learning from the data sets provided to the model in each round.

Although FIG. 10 illustrates one example of an online training process 1000, various changes may be made to FIG. 10. For example, while shown as a series of steps, various steps in FIG. 10 can overlap, occur in parallel, occur in a different order, or occur any number of times. As a particular example, in some embodiments, the selected item in block 1014 can be selected randomly. Also, in some embodiments, block 1002 may not need to be performed for a model that has been in use by a user for a period of time or in previous rounds.

Figure 11:
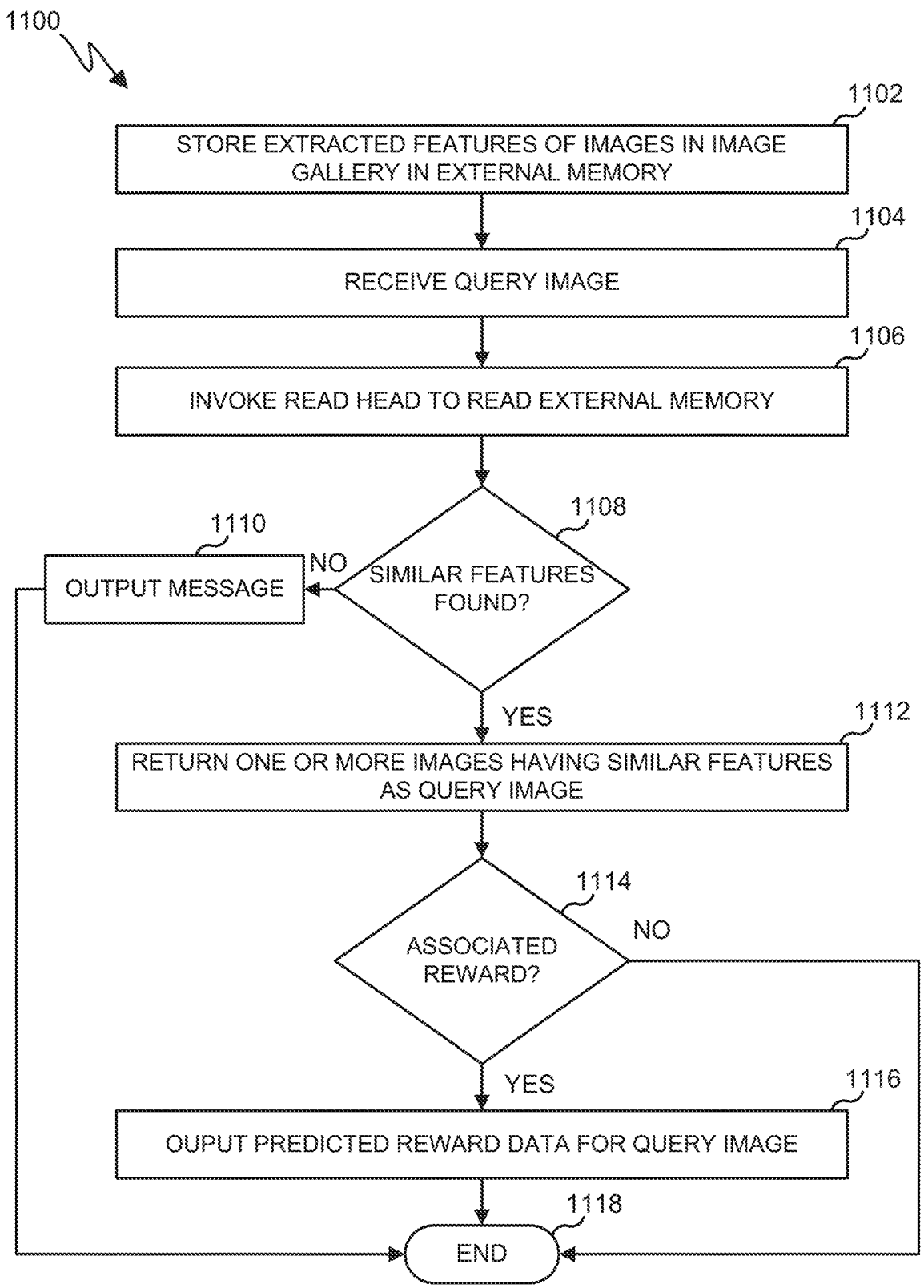
FIG. 11 illustrates an example image retrieval and prediction process in accordance with various embodiments of this disclosure.

FIG. 11 illustrates an example image retrieval and prediction process 1100 in accordance with various embodiments of this disclosure. For ease of explanation, the process 1100 may be described as being executed or otherwise used by the processor(s) 120 of any of the electronic devices 101, 102, 104 or the server 106 in FIG. 1. However, the process 1100 may be used by any suitable device(s) and in any suitable system. The process 1100 can be used with a deep memory model as described with respect to the various embodiments of this disclosure, such as the model 300.

At block 1102, the processor stores in a deep memory model extracted features of images of an image gallery in external memory. For example, a plurality of images in an image gallery stored on a mobile device can have features extracted from each image, and the deep memory model stores the extracted features in external memory such that common features of the extracted features of the plurality of images are associated in the external memory, as described with respect to the various embodiments of deep memory models of this disclosure. At block 1104, the processor receives a query image. The query image can be an image provided by a user so that the user can retrieve images including similar features from the image gallery or so that the user can receive an output indicating the contents of the image.

At block 1106, the processor invokes a read head associated with the deep memory model to read the external memory. At decision block 1108, the processor determines if data in external memory includes features in common with the query image. If not, the processor outputs a message that no results were found at block 1110. If the processor determines that similar features are found in the external memory at decision block 1108, the process 1100 moves to block 1112, where the processor returns one or more images having features in common with the query image as an output to the user. The process 1100 thus provides for features learned by the model and stored in external memory to be used to find images in the image gallery that share features with a new query or input images.

At decision block 1114, the processor determines if any of the one or more images returned in block 1112 have an associated reward, such as an image classification or label, stored in external memory. If not, the process ends at block 1118, with the output of the process 1100 including just the returned one or more images. If the processor determines that at least one of the one or more images returned in block 1112 has an associated reward stored in external memory at decision block 1114, the process 1100 moves to block 1116, where the processor outputs predicted reward data for the query image. For example, if the query image includes an image of a dog and the processor determines at decision block 1108 that the external memory includes similar features to the feature of the image of the dog and determines at decision block 1114 that the images sharing common features in external memory have associated reward data that labels the images as dog images, the processor can output a reward prediction to the user that the new query image is an image of a dog at block 1116. The process 1100 ends at block 1118.

Although FIG. 11 illustrates one example of an image retrieval and prediction process 1100, various changes may be made to FIG. 11. For example, while shown as a series of steps, various steps in FIG. 11 can overlap, occur in parallel, occur in a different order, or occur any number of times. As a particular example, in some embodiments, the processor may return just one of similar images or a prediction. Also, in some embodiments, the processor can store features of the query image in the external memory to potentially learn the features of the image from common features received in later other images after outputting the message at block 1110. Further, in some embodiments, when no similar features are found in decision block 1108, the processor can request new images from the user that include similar features to the query image instead of outputting a message indicating that no results were found, in order to provide more data to the deep memory model and to eventually learn the contents of the query image. It will be understood that the example process 1100 is but one example of an application of a deep memory model to a particular problem or service, and the deep memory models provided in this disclosure are not limited to the example process 1100.

Figure 12:
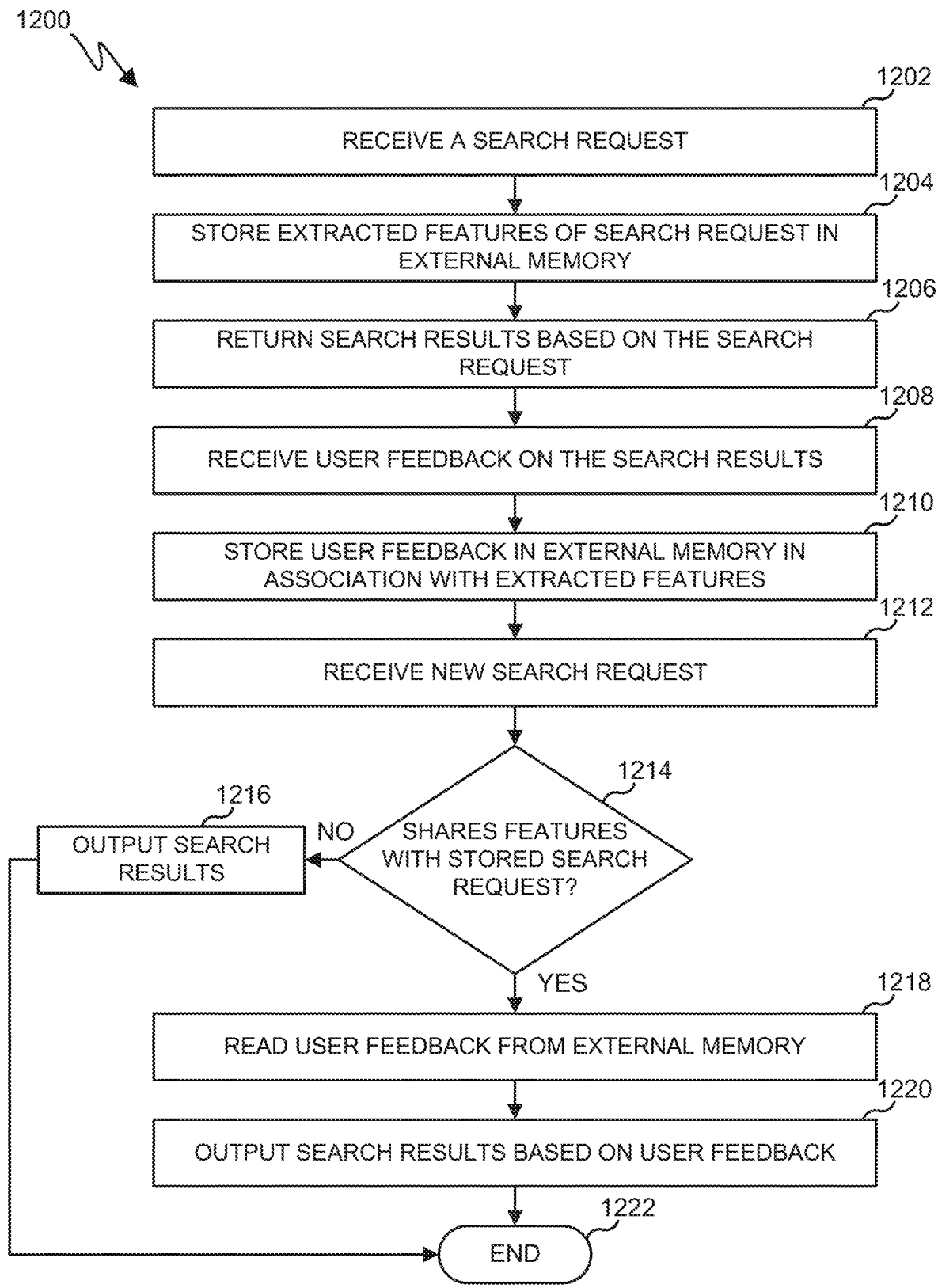
FIG. 12 illustrates an example interactive search and recommendation process in accordance with various embodiments of this disclosure.

FIG. 12 illustrates an example interactive search and recommendation process 1200 in accordance with various embodiments of this disclosure. For ease of explanation, the process 1200 may be described as being executed or otherwise used by the processor(s) 120 of any of the electronic devices 101, 102, 104 or the server 106 in FIG. 1, However, the process 1200 may be used by any suitable device(s) and in any suitable system. The process 1200 can be used with a deep memory model as described with respect to the various embodiments of this disclosure, such as the model 300.

At block 1202, the processor receives a search request, such as a text search request, a voice or speech request, or other types of search requests. At block 1204, the processor stores extracted features of the search request in external memory. For example, the search request could include a speech request processed by an NLU model to extract language features of the request, which are stored in external memory. At block 1206, the processor returns search results based on the search request. For example, a search request can include a request to see more of a type of product based on an image of a product. For instance, a user viewing an image of a shoe on a screen of an electronic device can provide a voice, text, or other type of search request to see similar products, with the search results provided at block 1206 including other shoe products.

At block 1208, the processor receives user feedback on the search results. For example, with respect to the search results of the other shoe products, the user can provide another input, such as a voice input, indicating that the user wishes or prefers to see only high-heel shoes. In some embodiments, the processor responds to the feedback by updating the search results. Additional feedback can then be provided on the updated search, such as feedback on colors, sizes, or styles in the shoe example, to provide more filtered results. The deep memory models of this disclosure can receive feedback or other reward data and store the reward data in external memory to better learn a user's preferences. At block 1210, the processor stores the user feedback received at block 1208 in the external memory in association with the extracted features of the search request. For example, if the search request was to retrieve shoe products and the user feedback was for high-heel shoes, the extracted features pertaining to shoes are stored in association with the feedback for only high-heel shoes.

At block 1212, a subsequent search request is received by the processor. Since the external memory has been updated with the search results and feedback from the previous search in blocks 1202-1210, the processor can learn from the previous search to inform subsequent searches. At decision block 1214, the processor determines if the external memory includes common features with the features of the new search request. If not, the process 1200 moves to block 1216, where the processor outputs search results based on the new search request. The process 1200 ends at block 1222.

If the processor determines that the new search request shares features with stored search request features from previous searches at decision block 1214, the process 1200 moves to block 1218, where the processor reads user feedback associated with the stored features of previous searches from external memory. At block 1220, the processor outputs search results in response to the new search request received at block 1212 based on the stored user feedback. For example, if the new search request received at block 1212 includes a request to search for shoe products and feedback from previous searches indicated certain parameters such as high-heel or blue shoes, the processor returns search results for blue high-heel shoes to meet the user's preferences even though the new search request does not specify either of the parameters. If the user's preferences have changed, the user can provide new feedback to the processor, which can be stored in external memory to inform further subsequent searches or recommendations. The process 1200 ends at block 1222.

Although FIG. 12 illustrates one example of an interactive search and recommendation process 1200, various changes may be made to FIG. 12. For example, while shown as a series of steps, various steps in FIG. 12 can overlap, occur in parallel, occur in a different order, or occur any number of times. As a particular example, in some embodiments, the process 1200 can loop back from block 1210 to output new search results based on the user feedback received in block 1208, continuing to output new search results as new feedback is received until no additional feedback is provided. It will be understood that the example process 1200 is but one example of an application of a deep memory model to a particular problem or service, and the deep memory models provided in this disclosure are not limited to the example process 1200.

Although this disclosure has been described with example embodiments, various changes and modifications may be suggested to one skilled in the art. It is intended that this disclosure encompass such changes and modifications as fall within the scope of the appended claims.

What is claimed is:

1. A method for managing a deep memory model Coupled to an external memory, the method comprising:
   receiving input data to the deep memory model;
   extracting a history state of the external memory based on the input data, wherein the external memory includes:
      a first set of memory cells for storing content item state data including data based on previously provided content items processed by the deep memory model; and
      a second set of memory cells for storing reward state data associated with the content item state data, the reward state data including one or more rewards corresponding to the previously provided content items, wherein the one or more rewards are used by the deep memory model to minimize a regret parameter associated with the previously provided content items;
   updating the history state of the external memory based on the input data by balancing most relevant read locations with least used locations, wherein the balancing includes:
      determining a set of weights least relevant to the input data;
      setting a last read weight vector to provide that the external memory is filled before any overwriting of the external memory; and
      defining write weights for writing the input data to the external memory based on the last read weight vector and the set of weights least relevant to the input data; and
   outputting a prediction based on the extracted history state of the external memory.

2. The method of claim 1, wherein the extracted history state includes data that shares one or more features with the input data.

3. The method of claim 2, wherein extracting the history state of the external memory includes:
   generating a key query vector based on an output state of the deep memory model;
   determining a distance between the key query vector and one or more rows of memory cells in the external memory;
   determining a relevant read weight vector based on the distance; and
   retrieving the history state of the external memory based on the relevant read weight vector.

4. The method of claim 1, wherein updating the history state of the determining that the external memory is full; and external memory includes:
   overwriting memory cells in the external memory that include data that is least relevant to the input data.

5. The method of claim 1, wherein:
   the input data includes an image; and
   the prediction includes a label for the image.

6. The method of claim 1, wherein:
   the input data includes a search query; and
   the prediction includes one or more search results.

7. An electronic device including a deep memory model, the electronic device comprising:
   at least one memory; and
   at least one processor coupled to the at least one memory, the at least one processor configured to:
      receive input data to the deep memory model;
      extract a history state of an external memory coupled to the deep memory model based on the input data, wherein the external memory includes:
         a first set of memory cells for storing content item state data including data based on previously provided content items processed by the deep memory model; and
         a second set of memory cells for storing reward state data associated with the content item state data, the reward state data including one or more rewards corresponding to the previously provided content items, wherein the one or more rewards are used by the deep memory model to minimize a regret parameter associated with the previously provided content items;
      update the history state of the external memory based on the input data by balancing most relevant read locations with least used locations, wherein, to balance the most relevant read locations with the least used locations, the at least one processor is configured to:
         determine a set of weights least relevant to the input data;
         set a last read weight vector to provide that the external memory is filled before any overwriting of the external memory; and
         define write weights for writing the input data to the external memory based on the last read weight vector and the set of weights least relevant to the input data; and
      output a prediction based on the extracted history state of the external memory.

8. The electronic device of claim 7, wherein the extracted history state includes data that shares one or more features with the input data.

9. The electronic device of claim 8, wherein, to extract the history state of the external memory, the at least one processor is configured to:
generate a key query vector based on an output state of the deep memory model;
determine a distance between the key query vector and one or more rows of memory cells in the external memory;
determine a relevant read weight vector based on the distance; and
retrieve the history state of the external memory based on the relevant read weight vector.

10. The electronic device of claim 7, wherein, to update the history state determine that the external memory is full; and
overwrite memory cells in the external memory that include data that is least relevant to of the external memory, the at least one processor is configured to: the input data.

11. The electronic device of claim 7, wherein:
the input data includes an image; and
the prediction includes a label for the image.

12. The electronic device of claim 7, wherein:
the input data includes a search query; and
the prediction includes one or more search results.

13. A non-transitory computer readable medium embodying a computer program, the computer program comprising instructions that when executed cause at least one processor of an electronic device to:
receive input data to a deep memory model;
extract a history state of an external memory coupled to the deep memory model based on the input data, wherein the external memory includes:
a first set of memory cells for storing content item state data including data based on previously provided content items processed by the deep memory model; and
a second set of memory cells for storing reward state data associated with the content item state data, the reward state data including one or more rewards corresponding to the previously provided content items, wherein the one or more rewards are used by the deep memory model to minimize a regret parameter associated with the previously provided content items;
update the history state of the external memory based on the input data by balancing most relevant read locations with least used locations, wherein the instructions that when executed cause the at least one processor to balance the most relevant read locations with the least used locations comprise instructions that when executed cause the at least one processor to:
determine a set of weights least relevant to the input data;
set a last read weight vector to provide that the external memory is filled before any overwriting of the external memory; and
define write weights for writing the input data to the external memory based on the last read weight vector and the set of weights least relevant to the input data; and
output a prediction based on the extracted history state of the external memory.

14. The non-transitory computer readable medium of claim 13, wherein the extracted history state includes data that shares one or more features with the input data.

15. The non-transitory computer readable medium of claim 14, wherein the instructions that when executed cause the at least one processor to extract the history state of the external memory comprise:
instructions that when executed cause the at least one processor to:
generate a key query vector based on an output state of the deep memory model;
determine a distance between the key query vector and one or more rows of memory cells in the external memory;
determine a relevant read weight vector based on the distance; and
retrieve the history state of the external memory based on the relevant read weight vector.

16. The non-transitory computer readable medium of claim 13, wherein the instructions that when executed cause the at least one processor to update the history state of the external memory comprise:
instructions that when executed cause the at least one processor to:
determine that the external memory is full; and
overwrite memory cells in the external memory that include data that is least relevant to the input data.

17. The non-transitory computer readable medium of claim 13, wherein:
the input data includes an image; and
the prediction includes a label for the image.

18. The non-transitory computer readable medium of claim 13, wherein:
the input data includes a search query; and
the prediction includes one or more search results.

19. The method of claim 1, wherein the reward state data includes one or more of: a rating, a label, a classification, and user feedback.

20. The electronic device of claim 7, wherein the reward state data includes one or more of: a rating, a label, a classification, and user feedback.

* * * * *